United States Patent
Kao et al.

(10) Patent No.: US 7,133,417 B1
(45) Date of Patent: Nov. 7, 2006

(54) MULTIPATH VOICE SWITCHING METHOD AND APPARATUS

(75) Inventors: Ruey Kao, Saratoga, CA (US); Venkat Kalkunte, San Jose, CA (US); Anant Kumar, Morgan Hill, CA (US); Hy Quoc Pham, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/405,787

(22) Filed: Sep. 27, 1999

Related U.S. Application Data

(60) Provisional application No. 60/142,140, filed on Jul. 2, 1999.

(51) Int. Cl.
*H04L 12/56* (2006.01)

(52) U.S. Cl. ............... 370/467; 370/401; 379/88.17

(58) Field of Classification Search ........ 370/351–359, 370/389, 395.1, 395.01, 395.5, 464–466, 370/395.21, 493, 400, 401, 252, 467; 379/88.17
See application file for complete search history.

(56) References Cited

U.S. PATENT DOCUMENTS

| | | | |
|---|---|---|---|
| 5,526,349 A | 6/1996 | Diaz et al. ............... 370/392 |
| 5,550,820 A * | 8/1996 | Baran ..................... 370/395.5 |
| 5,623,491 A | 4/1997 | Skoog ..................... 370/397 |
| 5,712,903 A * | 1/1998 | Bartholomew et al. .... 370/354 |
| 5,717,691 A | 2/1998 | Dighe et al. ............. 370/401 |
| 5,781,320 A | 7/1998 | Byers ...................... 398/56 |
| 5,802,045 A | 9/1998 | Kos et al. ................ 370/352 |
| 5,809,022 A | 9/1998 | Byers et al. .......... 370/395.51 |
| 5,894,477 A | 4/1999 | Brueckheimer et al. .... 370/353 |
| 5,914,934 A * | 6/1999 | Rathnavelu .............. 370/229 |
| 5,930,253 A | 7/1999 | Brueckheimer et al. .... 370/395.61 |
| 5,940,370 A * | 8/1999 | Curtis et al. ............. 370/231 |
| 5,956,334 A * | 9/1999 | Chu et al. ................ 370/395.2 |
| 5,963,555 A | 10/1999 | Takase et al. .......... 370/395.52 |
| 6,002,692 A | 12/1999 | Wills ....................... 370/465 |

(Continued)

FOREIGN PATENT DOCUMENTS

WO    WO 94/03004    2/1994

(Continued)

OTHER PUBLICATIONS

T. Bradley, RFC 1490, "Multiprotocol Interconnect over Frame Relay", Jul. 1993, 31 pages.*

(Continued)

*Primary Examiner*—John Pezzlo
(74) *Attorney, Agent, or Firm*—Blakely, Sokoloff, Taylor & Zafman LLP

(57) ABSTRACT

A switch apparatus and method according to the invention provides a carrier-class switching platform with a highly optimized data path and distributed signaling stacks to achieve high-density differential voice services. Incoming voice calls of any media type (TDM voice/fax, VoIP, VoATM, VoFR) are packetized and adapted for egress transmission of the same or another media type according to the service plan profile of the parties, and/or the instantaneous availability or cost of bandwidth resources. All calls are switched in an ATM switching core with QoS characteristics that can also be determined based on service plan profile. A call server handles call setup and management functions, as well as call signaling. Advantageously, the call server provides signaling relay functions to further support and enable the media conversion of voice calls. In an exemplary implementation of the invention, up to about 6720 concurrent VoIP calls can be supported in a single platform, with a latency of only about 17 msec ingress and 25 msec egress.

63 Claims, 11 Drawing Sheets

U.S. PATENT DOCUMENTS

| | | | |
|---|---|---|---|
| 6,034,954 A | 3/2000 | Takase et al. | 370/362 |
| 6,151,325 A | 11/2000 | Hluchyj | |
| 6,154,776 A * | 11/2000 | Martin | 370/396 |
| 6,172,973 B1 * | 1/2001 | Akhtar et al. | 370/354 |
| 6,252,847 B1 * | 6/2001 | Lee | 370/229 |
| 6,331,986 B1 * | 12/2001 | Mitra et al. | 370/468 |
| 6,381,239 B1 | 4/2002 | Atkinson et al. | 370/362 |
| 6,459,708 B1 * | 10/2002 | Cox et al. | 370/537 |
| 6,535,513 B1 * | 3/2003 | Kao et al. | 370/395.1 |
| 6,560,196 B1 | 5/2003 | Wei | 370/230.1 |
| 6,584,108 B1 | 6/2003 | Chung et al. | 370/401 |
| 6,611,516 B1 * | 8/2003 | Pirkola et al. | 370/352 |
| 6,611,531 B1 | 8/2003 | Chen et al. | 370/458 |
| 6,657,970 B1 | 12/2003 | Buckingham et al. | 370/249 |
| 6,747,995 B1 * | 6/2004 | Brown et al. | 370/493 |
| 6,763,017 B1 | 7/2004 | Buckingham et al. | 370/352 |
| 6,856,676 B1 * | 2/2005 | Pirot et al. | 379/201.01 |
| 2003/0198216 A1 * | 10/2003 | Lewis | 370/352 |

FOREIGN PATENT DOCUMENTS

| | | |
|---|---|---|
| WO | WO 00/02410 | 1/2000 |

OTHER PUBLICATIONS

J. Heinanen, RFC 1483, "Multiprotocol Encapsulation over ATM Adaptation Layer 5", Jul. 1993, 15 pages.*

Atlanta ATM Switch Core Chip Set Product Brief by Lucent Technologies (Mar. 1997).

LUC4AU01 ATM Layer UNI Manager (ALM) Preliminary Product Brief by Lucent Technologies (Mar. 1997).

Frame Relay Forum Technical Committee, "Voice Over Frame Relay Implementation Agreement, FRF.11.1," (Dec. 1998).

LUC4AS01 ATM Switch Element (ASX) Advance Product Brief by Lucent Technologies (Mar. 1997).

International Telecommunication Union (ITU). ITU-T, I.432. Integrated Services Digital Network (ISDN), ISDN User-Network Interfaces, B-ISDN User-Network Interface - Physical Layer Specification (Mar. 1993).

International Telecommunication Union (ITU). ITU-T, I.432.1. Series I: Integrated Services Digital Network, ISDN User-Network Interfaces - Layer 1 Recommendations, B-ISDN User-Network Interface - Physical Layer Specification: General characteristics. (Aug. 1996).

International Telecommunication Union (ITU). ITU-T, I.432.2. Series I: Integrated Services Digital Network, ISDN User-Network Interfaces - Layer 1 Recommendations, B-ISDN User-Network Interface - Physical Layer Specification: 155 520 kbit.s and 622 080 kbit/s operation. (Aug. 1996).

International Telecommunication Union (ITU). ITU-T, I.432.3. Series I: Integrated Services Digital Network, ISDN User-Network Interfaces - Layer 1 Recommendations, B-ISDN User-Network Interface - Physical Layer Specification: 1544 kbit/s and 2048 kbit/s operation. (Aug. 1996).

International Telecommunication Union (ITU). ITU-T, I.432.4. Series I: Integrated Services Digital Network, ISDN User-Network Interfaces - Layer 1 Recommendations, B-ISDN User-Network Interface - Physical Layer Specification: 51 840 kbit/s operation. (Aug. 1996).

International Telecommunication Union (ITU) - ITU-T, G.804. Digital Networks. ATM Cell Mapping into Plesiochronous Digital Hiererchy (PDH). (Nov. 1993).

LUC4AC01 ATM Crossbar Element (ACE) Advance Product Brief by Lucent Technologies (Mar. 1997).

The ATM Forum Technical Committee, "Traffic Management Specification Version 4.0," af-tm-0056.000 (Apr. 1996).

Peres, Mauricio, "Schalten wie in der Formel 1," Elektronik, De, Franzais Verlag GMBH. Munchen, vol. 47, No. 14, Jul. 1998, pp. 68-77, XP000669736.

"Lucent Technologies Announces Scaleable ATM-Switch Chip Set for High-Performance Switching Systems," Lucent Technologies Press Release, Mar. 24, 1997.

"Packet Voice Primer," http://cio.cisco.com/warp/public/779/largeent/multinet/packv_in.htm, 14 pgs. (Mar. 28, 1999).

"Getting Started With MVIP Switching (6400-11); Glossary," http:www.engweb.nmss.com/htmldoc/6400-11/appa.htm, 6 pgs. (Mar. 28, 1999).

"Service Level Agreements (SLA),"Newton's Telcom Dictionary, pg. 16 (date Unknown).

* cited by examiner

MULTIPATH VOICE SWITCHING METHOD AND APPARATUS

Priority is claimed based on Provisional Application No. 60/142,140 filed Jul. 2, 1999.

BACKGROUND OF THE INVENTION

1. Field of the Invention

The present invention relates to carrier class switches, and in particular, a method and apparatus for providing high density differential services for voice over packet network applications in an integrated carrier-class switching platform.

2. Description of the Related Art

Since the development of the telephone, many different technologies for providing voice (and, more recently, fax and video) communications between two or more remotely situated persons have been developed.

In a basic telephone circuit-mode call (sometimes called "plain old telephone service" or "POTS"), the communications pathway (i.e. a circuit) between two users (102 and 104 in FIG. 1) over the public switched telephone network (PSTN 106) is fixed for the duration of the call and is not shared by other users. Although several users may share one physical line, typically by use of frequency division multiplexing, only one user is assigned to a single voiceband channel at any given time.

In circuit mode, a connection is obtained by establishing a fixed pathway through the network. The route is established after the calling party initiates the call setup procedure by telling the network the address of the called party, i.e., after the user dials the telephone number.

The temporary connection between the parties through the network exists for the duration of the telephone call. During that period, the circuit is equivalent to a physical pair of wires connecting the two users. The physical circuit connection is dedicated to this call and is not shared by other users.

The signaling protocol for such circuit-mode calls is simple. Users signal their desire to place a call by physically lifting the telephone receiver from the switchhook. This places an electrical short on the line, allowing current to flow from the central office (108, 110), where it passes through the winding of a relay in a circuit switch (112, 114). The relay operates and the network "knows" that the user wants to place a call. The network, in turn, transmits a dial tone to the user as a signal that it is ready to receive the called party's number, which the calling party transmits to the network either as a series of dial pulses or tones. The network then determines the physical pathway to the called party and "rings" the called party's telephone. When the called party picks up, the connection is established and exists for the duration of the call.

Telephone service using ISDN has recently become popular, particularly for medium to large sized businesses. Although ISDN uses an out-band signaling protocol such as SS7 (as opposed to the in-band signaling used by POTS wherein the same wire that is used during the call is used by the network to set up and disconnect the call), telephone calls placed via ISDN also use the PSTN 106 and are circuit-mode, though the carrier must provide SS7 functionality (116, 118) in addition to conventional PSTN functionality.

More recently, packet-switched networks have proliferated, led by the popularity of the Internet and other public and private networks. However, because fixed and exclusive "connections" between users communicating via packet-switched networks are not possible because of their design for best-effort traffic only, they have not been thought suitable for carrying voice calls. Nevertheless, many standards have been developed for providing voice-over-the-network (VON). These include voice over IP networks (VoIP), voice over ATM networks (VoATM) and voice over frame relay networks (VoFR). Along with such standards, signaling protocols have been developed for setting up voice calls (e.g. H.323 for VoIP).

Confronted with these burgeoning standards, conventional service carriers have scrambled to keep up. Because supporting each new standard can require a significant outlay in expense and infrastructure, typically, such carriers can provide support for only selected standards. For example, a carrier might choose to support VoIP by providing an IP gateway (120, 122). However, current VoIP gateways can only support a small number of voice ports (typically, a maximum of 96 ports) using a centralized processing scheme. Moreover, current VoIP gateways introduce increased voice latency, thereby reducing the usefulness of the service.

Furthermore, such VoIP gateways can only perform TDM to IP packet over Ethernet conversion, which provides only a signal path VON. They can not perform conversions to other media types such as ATM or FR, and therefore they can't provide differential VON services. Relatedly, conventional VoIP gateways do not support functionality for relaying between the various signaling protocols (e.g. SS7 to H.323). The ability to convert between different types of VON services (i.e. differential or "multipath" VON) in a single switching platform would be particularly useful, for example, for allowing users with any type of voice service to communicate with users having any other type of voice service. Moreover, such conversion functionality would also permit voice services customers to have established service profiles indicating their willingness to pay for more quality of service or preference for more value. Individual incoming or outgoing calls from such customers could then be treated according to their service profiles, in addition to the availability of system resources and their instantaneous cost or capacity.

Accordingly, there remains a need in the art for an integrated switching apparatus that solves the above-mentioned problems. The present invention fulfills this need.

SUMMARY OF THE INVENTION

Accordingly, an object of the present invention is to provide a switching apparatus and methodology that provides differential voice over the network services.

Another object of the present invention is to provide a switching apparatus and methodology that provides differential voice over the network services in an integrated carrier-class platform.

Another object of the present invention is to provide a switching apparatus and methodology that provides high-density differential voice services based on a calling party's profile.

Another object of the present invention is to provide a switching apparatus and methodology that provides high-density differential voice over the network services.

Another object of the present invention is to provide a switching apparatus and methodology that provides differential voice over the network services with reduced voice latency.

Another object of the present invention is to provide a switching apparatus and methodology that provides signaling relay functions between PSTN and IP, ATM and FR networks.

Another object of the present invention is to provide a switching apparatus and methodology that provides multi-path voice over the network services.

To achieve these objects and others, the switch apparatus and method according to the invention provides a carrier-class switching platform with a highly optimized data path and distributed signaling stacks to achieve high-density differential voice services. Incoming voice calls of any media type (TDM voice/fax, VoIP, VoATM, VoFR) are packetized and adapted for egress transmission of the same or another media type according to the service plan profile of the parties, and/or the instantaneous availability or cost of bandwidth resources. All calls are switched in an ATM switching core with QoS characteristics that can also be determined based on service plan profile. A call server handles call setup and management functions, as well as call signaling. Advantageously, the call server provides signaling relay functions to further support and enable the media conversion of voice calls. In an exemplary implementation of the invention, up to about 6720 concurrent VoIP calls can be supported in a single platform, with a latency of only about 17 msec ingress and 25 msec egress.

BRIEF DESCRIPTION OF THE DRAWINGS

These and other objects and advantages of the present invention will become apparent to those skilled in the art after considering the following detailed specification, together with the accompanying drawings wherein:

FIG. 12 illustrates the software processes executing within the switch apparatus and call server for supporting differential voice services according to the present invention.

DETAILED DESCRIPTION OF THE INVENTION

Figure 1:
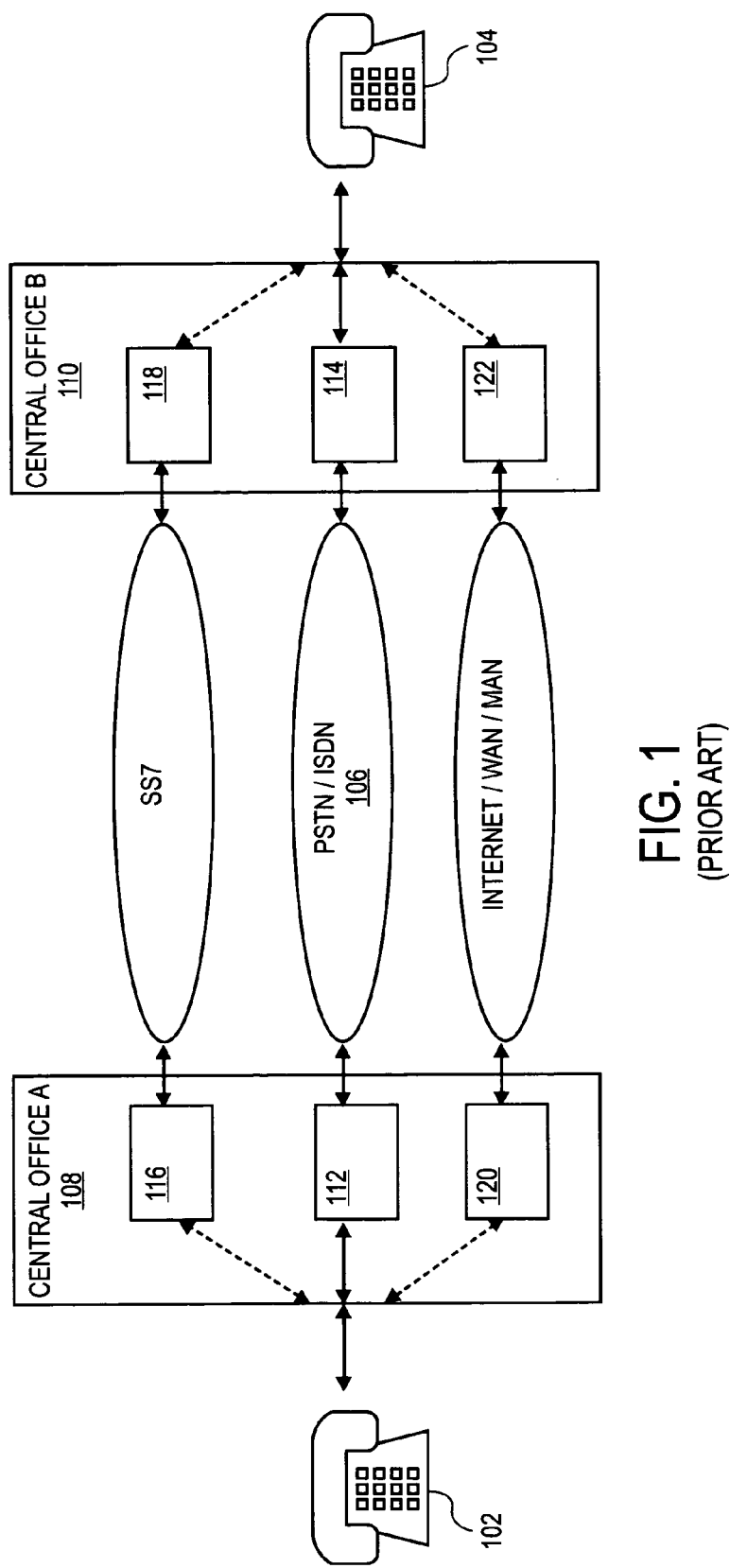
FIG. 1 illustrates conventional techniques for providing voice services.
Figure 2:
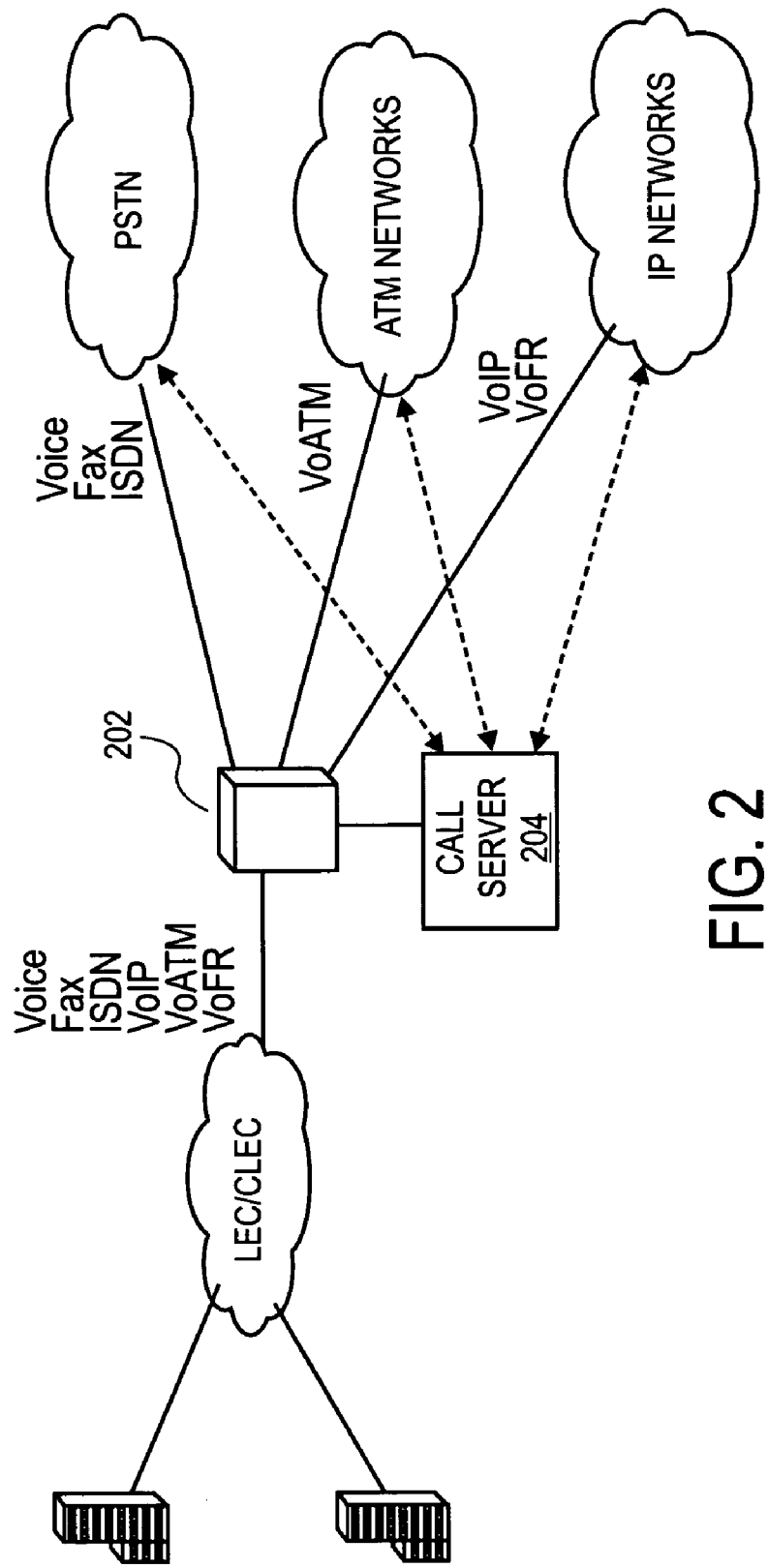
FIG. 2 is a top-level diagram illustrating an exemplary implementation of the present invention.

FIG. 2 illustrates an exemplary implementation of the present invention. As can be seen, a switch apparatus 202 according to the invention provides, within a single device, the capability to switch calls of any media type (for example, POTS or ISDN voice/fax/video, VoIP, VoFR and VoATM) among, for example, LEC/CLECs, PSTNs, and ATM and IP networks.

Switch apparatus 202 further communicates with call server 204 for call setup and management. Call server 204 is preferably embodied as a Unix box loaded with software for executing several concurrent server processes, with corresponding client processes executing in switch apparatus 202, the server and client processes communicating via TCP, for example. However, it should be apparent that many alternative hardware and software embodiments are possible, and that some or all of the functionality performed by call server 204 may be incorporated within switch apparatus 202 and vice-versa.

Figure 3:
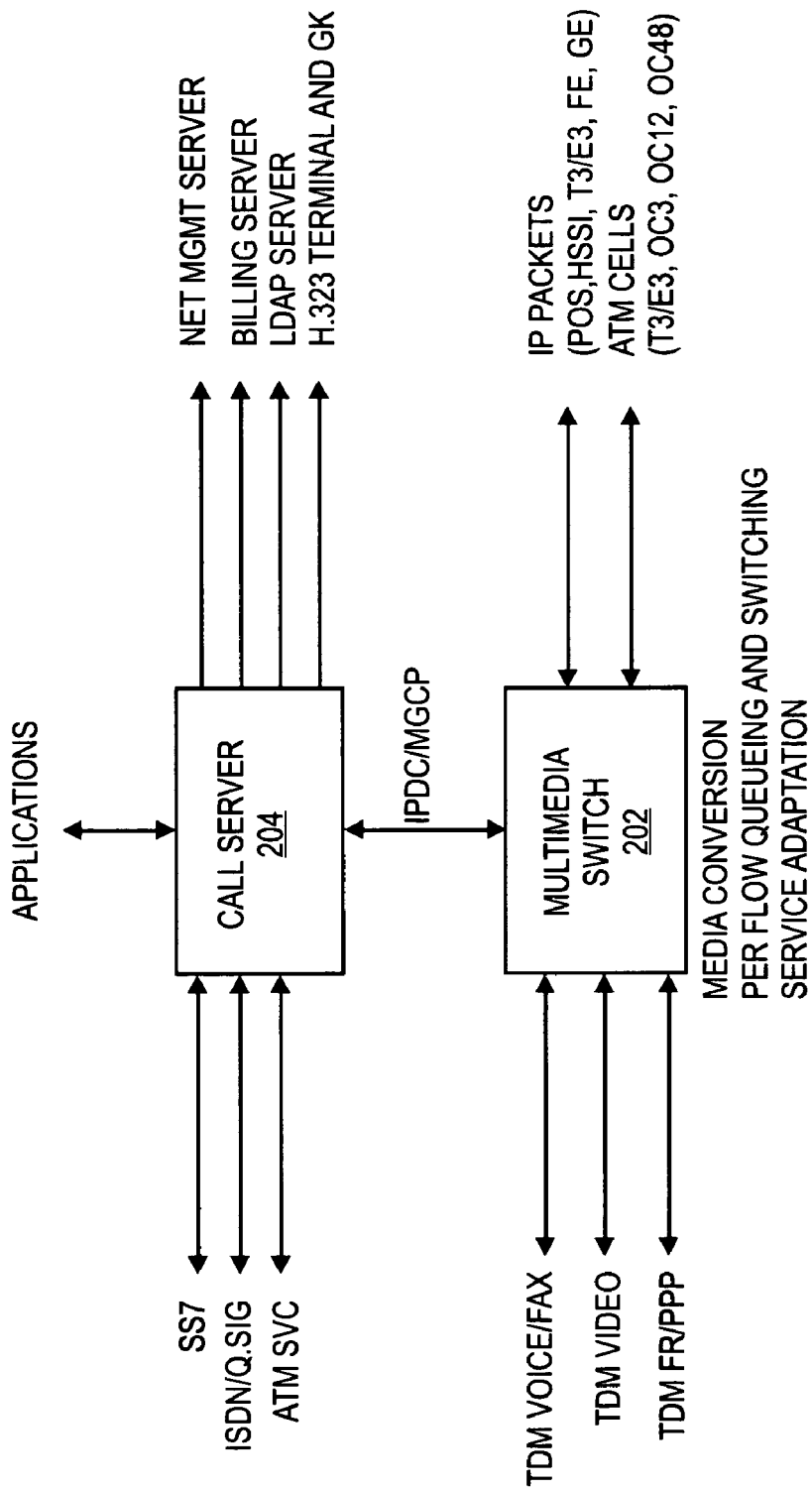
FIG. 3 is a block diagram illustrating a call server and multimedia switch in accordance with the principles of the invention.

FIG. 3 further illustrates the interoperation of switch apparatus 202 and call server 204. As shown, call server 204 performs multipath call signaling functions by interacting with signaling services such as SS7, ISDN/Q.SIG, ATM SVC and H.323 Terminal & GK. Call server 204 can also communicate with an LDAP server for route management, with a billing server for customer billing services, and with a network management server for service provisioning, device configuration & management, etc. Call server 204 can further communicate with applications such as IP Centrex server, Audio conference server, etc. In this example of the invention, there is one switch apparatus 202 associated with call server 204. However, it should be apparent that several switch apparatuses 202 can be associated with call server 204.

Switch apparatus 202 enables the flow of data associated with calls controlled by call server 204. It also performs any conversion required between ingress and egress media types. In other words, if an incoming voice call is received from the PSTN and is to be transmitted over the Internet in the form of VoIP packets, switch apparatus 202 performs the conversion. Switch apparatus 202 also performs the queueing and switching of calls between and across networks, which queueing and switching can be in accordance with differential quality of service requirements for the calls that can be established by call server 204.

As can be seen from FIG. 3, in this example of the invention, the functionality of call server 204 actually involves the interoperation of software processes executing on both call server 204 and switch apparatus 202. For this reason, the actual structural details of call server 204 are not as important as the structural details of switch apparatus 202, and a description of the software processes for controlling and managing calls using switch apparatus 202 will be deferred until after a complete description of switch apparatus 202.

Accordingly, the structural details of switch apparatus 202 of the invention will now be described in more detail. However, it should be noted that an example of a switch apparatus 202 that can be adapted for use in providing multipath voice over the network services in accordance with the present invention is also described in co-pending U.S. Provisional Appln. No. 60/123,798, commonly owned by the assignee of the present invention, the contents of which are incorporated herein by reference. Such a switch apparatus 202 is illustrated in FIG. 4.

Figure 4:
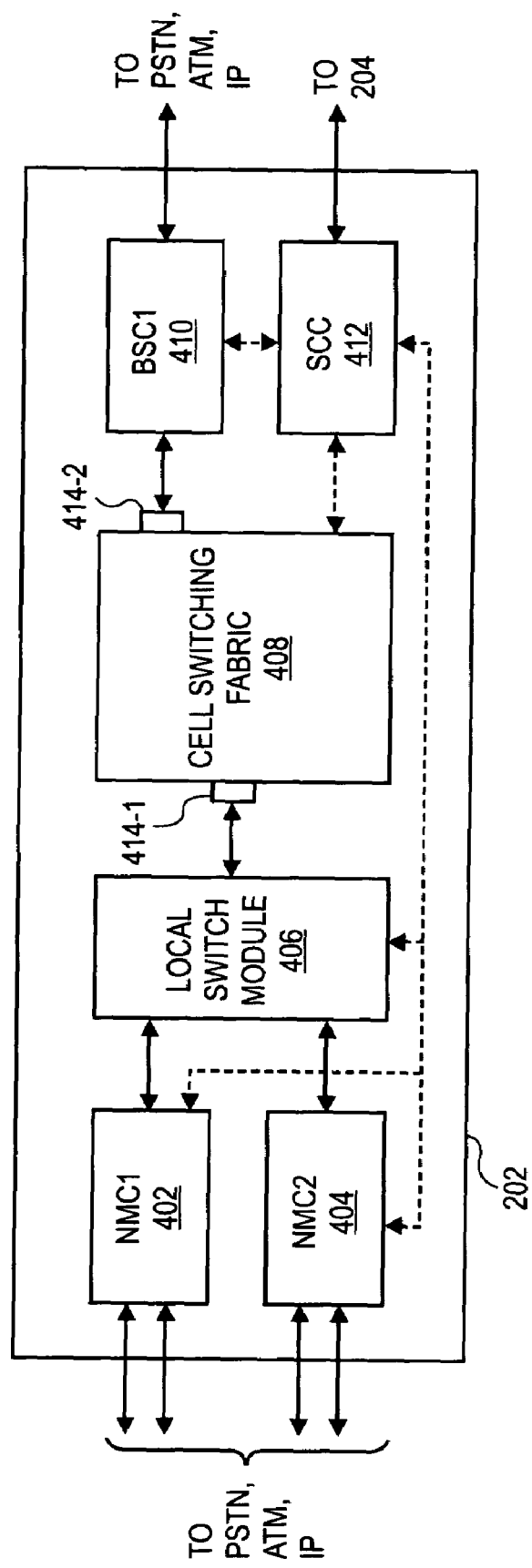
FIG. 4 further illustrates a multimedia switch that can be used in the example of the invention illustrated in FIG. 3.

Briefly, as shown in FIG. 4, switch apparatus 202 includes an ATM cell switching fabric 408 that switches high-density ATM cell traffic between switch ports 414-1 . . . 414-N. Coupled to one of the switch ports is a broadband service card (BSC1) 410 for interfacing with a plurality of broadband connections. Coupled to a second one of the switch ports is a switch control card (SCC) 412. Coupled to another of the switch ports is a local switch module 406. Further coupled to the switching module is a plurality of narrowband line cards (NMC1, NMC2) 402, 404 for interfacing with a plurality of narrowband connections.

ATM cell switching fabric 408 is, for example, an ATLANTA chipset switch fabric comprised of 8×8 array of switch elements such as LUC4AC01 ATM Crossbar Elements made by Lucent Technologies of Allentown, Pa. Such a switch fabric switches ATM traffic between eight switch ports 414-1 . . . 414-8 (only two such ports shown in FIG. 4 for clarity). Switch ports 414 are preferably OC-12 or equivalent ports. An implementation of such an ATM cell switching fabric is described in Lucent Technologies Product Brief, "ATLANTA ATM Switch Core Chip Set," March 1997, the contents of which are incorporated herein by reference.

BSC1 410 provides an interface between one switch port of the ATM cell switching fabric 408 and one or more broadband connections such as T3/E3, OC-3, and OC-12 lines and/or ports. Although only one broadband interface card is shown, it should be apparent that there may be several.

SCC 412 contains the hardware for executing the software processes for establishing, routing and managing virtual circuit connections between all ports of the switch apparatus. It also provides functionality for communicating with external call server 204 for call setup and management, as is useful to implement the functionality of the present invention and will be described in more detail below.

Local switch module 406 provides an interface between one switch port 414 of the ATM cell switching fabric 408 and one or more narrowband line cards NMC1 402, NMC2 404. The switch port of the ATM cell switching fabric that is coupled to local switch module 406 is configured to control, for example, 16 multiPHY devices on the physical layer side. This can be implemented using, for example, a LUC4U01 ATM Layer UNI Manager (ALM) from Lucent Technologies (not shown). Transfers of ATM cells between ATM cell switching fabric 408 (via ALM) and local switch module 406 are preferably performed via a 16-bit UTOPIA II interface (not shown). The local switch module 406 thus allows all the narrowband connections to share the bandwidth of one broadband connection.

NMC1 402 and NMC2 404 each provide an interface between local switching module 406 and one or more narrowband connections such as NxDS0, NxT1/E1, Ethernet, ISDN lines and/or ports. Although two narrowband interface cards are shown, it should be apparent that there may be one or several.

Generally, the switch apparatus illustrated in FIG. 4 implements a three stage switching process. Various types of media streams presented to the switch apparatus by the broadband and narrowband flows are converted to ATM cells and enqueued in corresponding virtual circuit (VC) queues. ATM cell switching is performed among the different cards based on the quality of service requirement for each virtual circuit. The switched ATM cells are then converted to the outgoing media types and output to the necessary broadband and narrowband flows. The switch apparatus is adapted to perform rate shaping and traffic management so as to guarantee the quality of service for various media types (voice, video, data) and also minimize the traffic loss due to rate mismatch between narrowband and broadband connections during the burst period. By virtue of this implementation, the switch apparatus of the present invention can perform any-to-any media type switching as listed in Table 1.

TABLE 1

Switching Matrix

| Input\Output | Voice/Fax/Video | Frame [FR, PPP] | ATM Cell | LAN |
|---|---|---|---|---|
| Voice/Fax/Video | Voice Switching | VoFR/VoIP Frame Switching | VoATM/VoIP FR/ATM Interworking | VoIP Encapsulation e.g. RFC 1490 |
| Frame [FR, PPP] | VoFR/VoIP | | | |
| ATM Cell | VoATM/VoIP | FR/ATM Interworking | Cell Switching | Encapsulation e.g. RFC 1483 |
| LAN | VoIP | Encapsulation e.g. RFC 1490 | Encapsulation e.g. RFC 1483 | LAN Switching |

Figure 5:
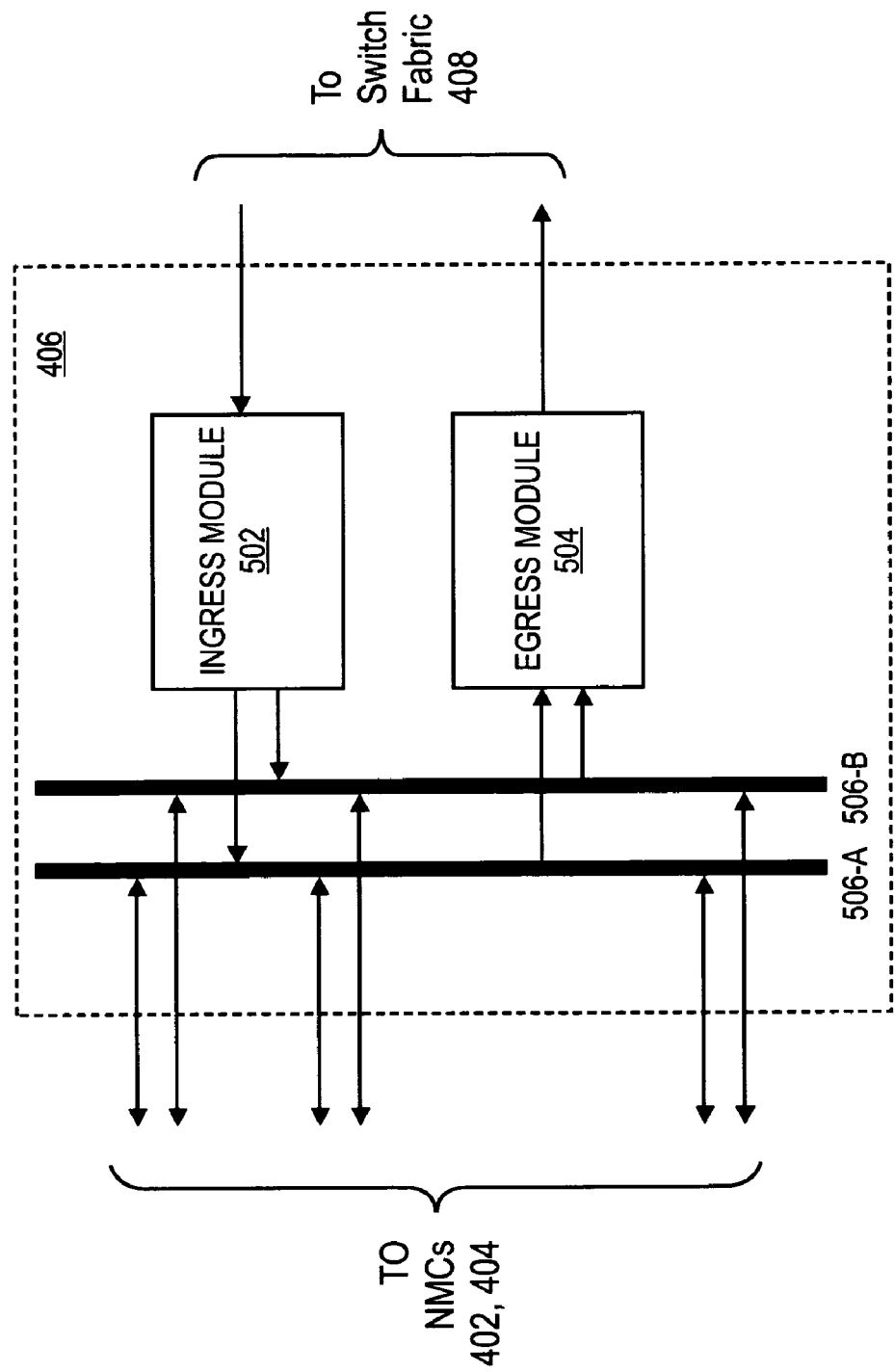
FIG. 5 further illustrates a local switch module that can be used in the multimedia switch illustrated in FIG. 4.

FIG. 5 further illustrates a local switch module 406 such as that included in the switch apparatus 202 shown in FIG. 4. As shown in FIG. 5, local switch module 406 includes shared buses 506-A and 506-B to which NMCs are coupled for communicating ATM cells. Local switch module 406 further includes an ingress module 502 and an egress module 504 that are responsible for interfacing ATM cells between the low-speed NMCs and the high-speed ATM cell switching fabric. Preferably, the ingress and egress modules are separately embodied as FPGAs.

Shared buses 506-A and 506-B are preferably each a Cubit-Pro CellBus from TranSwitch Corp. of Shelton, Conn. The shared buses can be configured for load sharing mode, wherein both buses are active at the same time, or they can be configured for redundancy mode, wherein only one of the buses is active.

An example of a local switch module 406 that can be adapted for use in a switch apparatus 202 in accordance with the present invention is described in co-pending U.S. Provisional Appln. No. 60/123,798, commonly owned by the assignee of the present invention, the contents of which are incorporated herein by reference.

Figure 6:
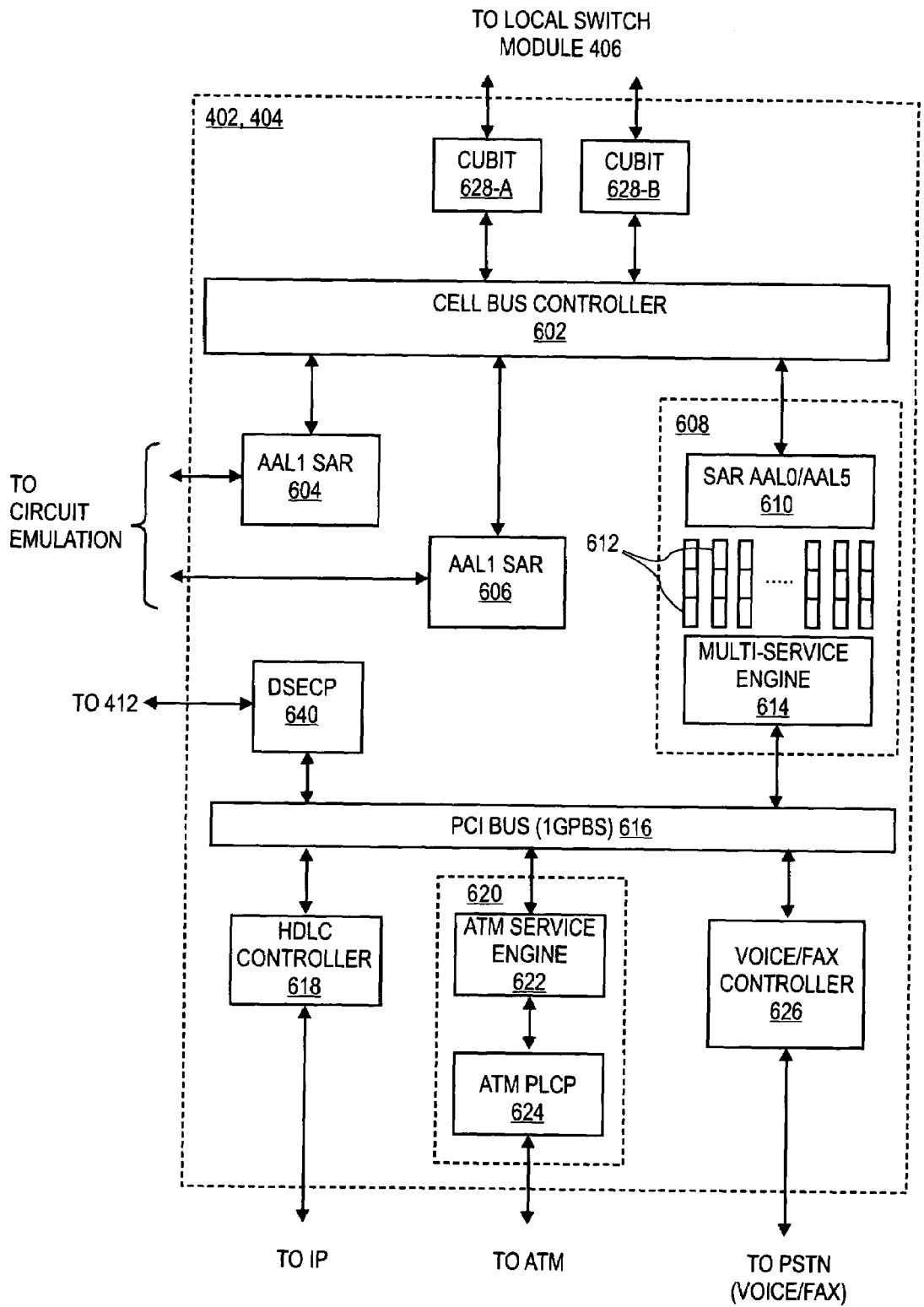
FIG. 6 further illustrates a narrowband line card that can be used in the multimedia switch illustrated in FIG. 4.

FIG. 6 further illustrates a narrowband card 402, 404 that can be included in the switch apparatus 202 illustrated in FIG. 4. It should be noted, however, that broadband card(s) 410 contains much the same functionality for processing ingress and egress voice calls of any media type as will be described hereinbelow, but does not require functionality for interfacing with local switch module 406. The implementation details of providing such functionality described below in a broadband(s) card 410 should be apparent to those skilled in the art after being taught by the present specification.

As shown, narrowband card 402, 404 includes a cell bus controller 602 that communicates with two Cubit chips 628-A and 628-B, and a virtual circuit (VC) controller 608. The VC controller 608 further communicates with a packet controller 618, an ATM cell controller 620, and a voice/fax controller 626 via a shared bus 616. The cell bus controller 602 further communicates with first AAL1 SAR chip 604 and second AAL1 SAR chip 606.

A DSE control processor (DSECP 640) also communicates with voice/fax controller 626 via shared bus 616 and with call server processes executing in SCC 412. Preferably, DSECP 640 is implemented as a software process executing on a processor such as a R5000 RISC processor.

The cell bus controller 602 is preferably implemented as a FPGA and provides five Utopia interfaces—between the two Cubit chips 628-A and 628-B, the first AAL1 SAR chip 604, the second AAL1 SAR chip 606 and the VC controller 608. The cell bus controller 602 plays the role of an ATM layer multiplexer device providing interfaces to the shared buses 506-A and 506-B of the local switch module 406 from multiple PHY devices with different priorities. That is, the cell bus controller 602 multiplexes ATM cells from the low-speed interfaces connected to the NMC with the high-speed port of the ATM cell switching fabric which the NMC shares with other NMCs via the shared bus of the local switch module 406.

The first and second AAL1 SAR chips 604, 606 are, for example, PMC73121 AAL1gator II chips from PMC-Sierra and are programmed to be in the single PHY mode. Between the SAR chips and the cell bus controller there are FIFOs (not shown) which isolate the clocking domains. The SAR's Utopia runs at 33 MHz. The FIFOs are, for example, SuperSync device IDT72261 from IDT of Santa Clara, Calif. The first and second AAL1 SAR chips 604, 606 provide, for example, circuit emulation interfaces to ATM networks using T1/E1, T3/E3, and/or OC-3 services.

VC controller 608 is preferably implemented by, for example, an L64363 ATMizer II+ from LSI. The VC controller's Utopia port is also configured to be in the single PHY mode. The Utopia clock runs at 40 MHz which is synchronous to the Cubit's Utopia clock. Also, the ATMizer is preferably configured to ignore parity on the Utopia bus.

As shown, VC controller 608, which can be implemented by, for example an ATMizer chip, includes a SAR AAL0/AAL5 engine 610, a plurality of VC queues 612, and a multi-service engine 614. VC controller 608 communicates with SCC 412 for cell flow management, as will be described in more detail below.

Generally, ATM cells received from, or to be sent to, the narrowband interfaces via shared bus 616 are stored in the VC queues 612. The rates at which the VC queues 612 are respectively serviced are determined by the quality of service for the particular flows to which the ATM cells stored in the VC queues belong. SAR engine 610 performs segmentation and reassembly functions for AAL5 frames and cell forwarding for AAL0 frames. It also runs a schedule-based service algorithm to determine which VC queue should be serviced (i.e., for transmitting a cell) at each cell time. VC queues 612 are implemented by a linked list of buffers. Multi-service engine 614 is a software module that performs packet translation if necessary (e.g. FR to ATM network or service interworking), service functions based on header lookup, flow to VC mapping, and queuing of cells to the appropriate per-VC queue 612. Multi-service engine 614 obtains flow-to-VC mapping information, and quality of service information for flows from SCC 412. The management of flows and quality of service requirements for flows according to the present invention will be described in more detail below in conjunction with the call server 204 description.

Shared bus 616 is preferably a PCI bus adapted for transfers of 1 Gbps.

Packet controller 618 interfaces between packets and frames that are input/output via attached IP/Frame Relay networks and ATM cells that are input/output via cell bus controller 602 and converted to packets and frames by VC controller 608. Preferably, it includes a HDLC controller (such as a PEB20324 from Siemens, for example) which performs HDLC functions such as bit stuffing/unstuffing, CRC checking, etc. Packets and frames received by packet controller 618 from attached IP/Frame Relay networks are processed by the HDLC controller and sent to multi-service engine 614 via shared bus 616 for conversion to ATM cells and queuing in per-VC queues 612. Conversely, ATM cells destined for attached IP/Frame Relay networks are converted to packets by multi-service engine 614 and forwarded to packet controller 618 via shared bus 616, which then immediately forwards them to the appropriate IP/Frame Relay network port.

ATM cell controller 620 forwards ATM cells that are input from attached ATM networks to multi-service engine 614 via shared bus 616 and forwards ATM cells destined to attached ATM networks that are received from the switch fabric via cell bus controller 602 to the attached ATM networks.

As shown, ATM cell controller 620 preferably includes an ATM service engine 622 and an ATM PLCP 624. ATM service engine 622 performs dual leaky bucket UPC based on ATM Forum 4.0 and uses a VPI/VCI index into a table to find the corresponding VC queue when forwarding cells between multi-service engine 614 and attached ATM networks. ATM PLCP 624 performs ATM physical layer functions according to ITU-I.432 and direct cell mapping to DS1 or E1 transmission systems according to ITU-T G.804.

Voice/fax controller 626 converts voice/fax data that is received via attached PSTN networks into packets that are then forwarded to multi-service engine 614 via shared bus 616, and likewise converts packetized voice/data that is destined for attached PSTN networks and is received from multi-service engine 614 via shared bus 616 into voice/fax data for forwarding over the attached PSTN networks. Voice/fax controller 626 communicates with DSECP 640 for managing voice/fax flows. The management of voice/fax flows according to the present invention will be described in more detail below and in conjunction with the call server 204 description.

Figure 7:
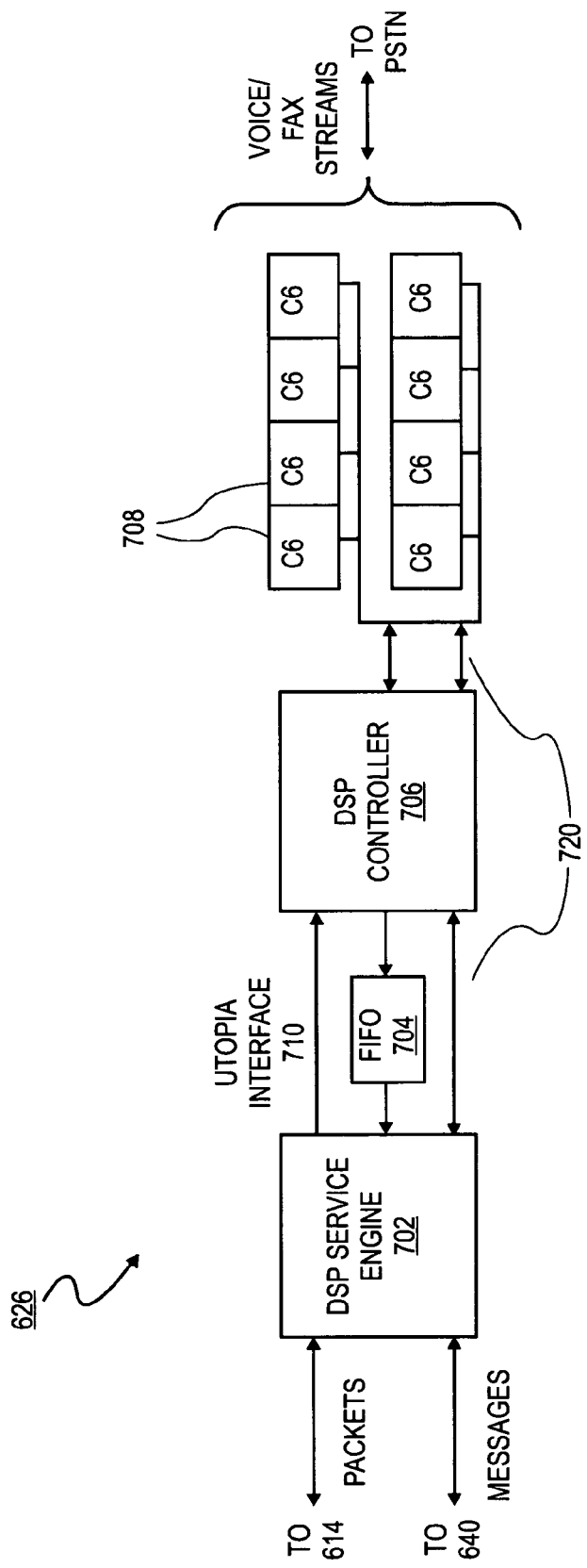
FIG. 7 further illustrates a voice/fax controller that can be used in the narrowband line card illustrated in FIG. 6.

FIG. 7 further illustrates a voice/fax controller 626 that can be included in the narrowband line card 402, 404 illustrated in FIG. 6. As shown, it preferably includes a digital signal processor (DSP) service engine (DSE) 702, a DSP controller 706, and a set of DSPs 708-1 ... 708-N. DSE 702 is preferably implemented by a LSI L64364 ATMizer II+. DSPs 708 are preferably implemented by TMS320C6201 chips from Texas Instruments. DSP controller 706 is preferably implemented by a FPGA.

As shown, DSP controller 706 provides the interface between the DSE and the DSPs. DSE 702 communicates with DSP controller 706 via a UTOPIA data path interface 710 from which it receives, decodes and executes messages. DSE 702 also controls the DSP controller 706 and accesses DSPs directly via a secondary port 720. DSE 702 communicates messages relating to call connection management with DSECP 640.

DSE 702 operates in slave mode, with cell data outputs from its transmit FIFO (not shown) going to the UTOPIA master, and cell data inputs from DSP controller 706 master being input to its receive FIFO 704. DSP controller 706 accesses the DSPs via its host port interface (described below). DSE 702 is mainly responsible for performing media type adaptation of voice/fax flows received or sent over PSTN networks connected to switch apparatus 202.

The functionality of DSE 702 will be described in more detail below. Briefly, however, TDM-based voice/fax data streams received by voice/fax controller 626 from attached PSTN networks (via a time slot interchanger known in the art such as a Mitel TSI, for example) are digitized and packetized by the DSPs and stored in DSP output queues (not shown). DSP controller 706 forwards the voice/fax packets from the DSP output queues to DSE 702. DSE 702 then assembles the packets in accordance with the egress media type for the voice/fax connection, as learned from call server 204 via DSECP 640. If the egress media type is IP, for example, the DSE adds a RTP, UDP, and IP header to the packets and forwards them to multi-service engine 614 via shared bus 616. Conversely, DSE 702 receives packetized voice/fax data streams from multi-service engine 614 via shared bus 616. DSE 702 then converts the packets of the ingress media type into voice/fax data. For example, if the ingress media type is IP, DSE 702 removes the RTP, UDP and IP headers of the packets and writes the voice packets to the appropriate DSP input queues (not shown). The DSPs convert the packetized data into voice/fax streams for output via attached PSTN networks.

Figure 8:
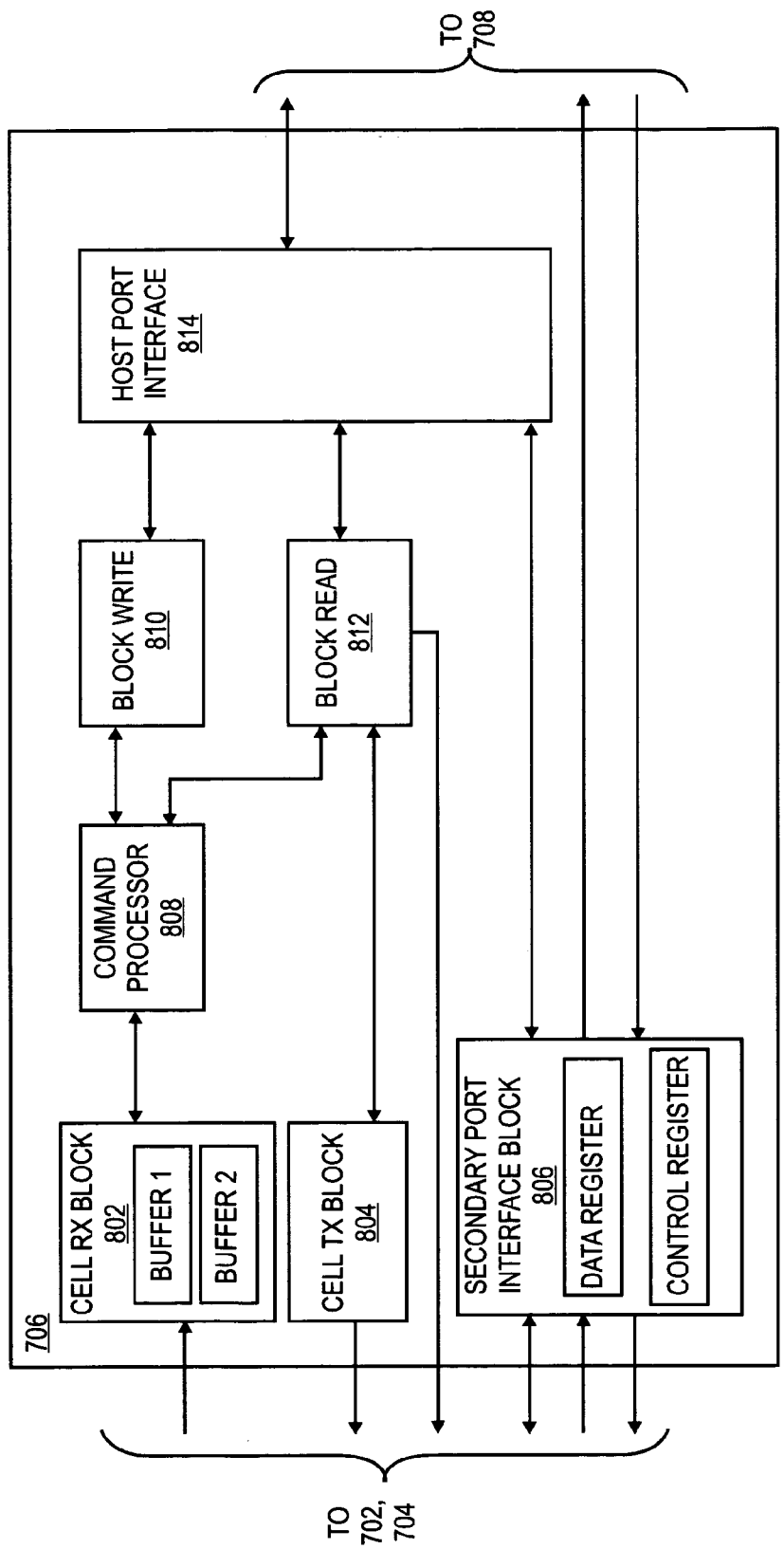
FIG. 8 further illustrates a DSP controller that can be used in the voice/fax controller illustrated in FIG. 7.

FIG. 8 further illustrates a DSP controller 706 such as that illustrated in FIG. 7. As shown, it includes a cell receive block 802, a cell transmit block 804, a command processor 808, a secondary port interface (SPI) block 806, a host port interface (HPI) block 814, and block read unit 812, and a block write unit 810.

The cell receive block 802 interfaces with the DSE 702 receive port. DSP controller 706 acts as Utopia master and DSE 702 as slave. The cell receive block 802 is responsible for loading the messages into internal RAM buffers (as shown), which provide storage for two cells. Command processor 808 issues a load command to cell receive block 802, and cell receive block 802 generates a ready signal when the corresponding buffer contains valid data. The command processor 808 then decodes and executes the contents of the current buffer while cell receive block 802 is loading the next buffer.

Cell receive block 802 checks the parity of the receive data bus and compares it to the incoming parity bit. The parity error bit in Interrupt 0 vector register is set and the DSP controller 706 asserts an interrupt signal when a parity error is detected.

Cell receive block 802 saves the parity bits for the header word, which bits are looped back for a Block Read operation when the header word is written to the external FIFO.

The cell buffers (as shown) are implemented using embedded 256 by 8 bit wide RAMs. The command processor 808 is able to overlap the reading of the buffers with transferring of data to the host port-interface 814 by using a "prefetch" mechanism. The command processor 808 asserts a next word load signal and cell receive block 802 automatically reads the next 4 bytes and form a 32 bit word at the buffer data outputs.

Cell transmit block 804 interfaces to DSE 702's transmit port. The block read unit 812 directly writes cell data to external FIFO 704 while the almost full flag remains deasserted.

Immediately after reset, cell transmit block 804 waits until the block read unit 812 has programmed the external FIFO almost full and almost empty flags. When the external FIFO 704 contains at least one full cell, the almost empty flag will be de-asserted. When the DSE 702 asserts a signal indicating that a cell is available the cell transmit block 804 will proceed to generate the control signals to read the data out of the external FIFO 704 and into the DSE 702. The cell transmit block 804 maintains an octet counter to keep track of the words read out of the external FIFO and to generate a start of cell signal.

A read enable signal is input to the external FIFO 704, which signal is delayed one clock, thus indicating valid data on the input pins. The external FIFO almost empty flag is valid on the second clock following a read cycle and it is registered at the input of the DSP controller 706. The cell transmit state machine 804 samples the internal almost empty flag three clock cycles after the last byte of a cell have been read out of the external FIFO to accommodate the latencies.

SPI block 806 communicates with the secondary port interface of the DSE 702 so as to provide direct access to DSP memory locations, HPI block registers, DSP reset control, reading and clearing of the Interrupt 0 vector register, and reading of the Interrupt 1 vector register.

The SPI runs asynchronously to the DSP controller 706. SPI block 806 detects the falling edge of an access signal from the SPI to initiate a secondary port access to the DSP controller 706, and asserts a ready signal when the cycle is completed. Two address lines and a write enable signal are used to provide access to four addressable locations within the DSP controller 706: a read/write control register (shown), a read/write data register (shown), the Interrupt 0 vector register (not shown), and the Interrupt 1 vector register (not shown).

The read/write control register (as shown) is loaded first and is used to set up the starting addresses for reads and writes, as well as selecting one of the DSPs. The OpCode field of the read/write control register and the write enable signal determine the behavior of the read/write operation. An OpCode value of "100" causes a read or write operation to the selected address of the selected DSP to be performed. An OpCode value of "101" causes a write operation into the DSP Reset register. OpCode values of "000" through "011" cause the indicated HPI register of the selected DSP to be accessed for diagnostic purposes.

Selection of the Interrupt 0 and 1 vector registers (not shown) allows the contents of these registers to be viewed.

Command processor 808 issues buffer load requests to cell receive block 802. When the cell receive block 802 has loaded 64 bytes into a cell buffer it will assert the corresponding buffer ready flag. The command processor 808 decodes the message type field of the header word and asserts a start signal to the block write unit 810 or the block read unit 812. The command processor 808 issues a buffer load request to the alternate buffer while the block write or block read units 810, 812 are operating on the data from the first cell buffer. The command processor 808 also muxes the data and control signals between the cell receive block 802 and the block write and block read units 810, 812.

When block write unit 810 receives a start signal from the command processor 808, it loads the cell data message length field into a message counter register, loads the DSP ID field into a register, and asserts a signal to "prefetch" the read/write DSP address word from the buffer. It asserts an initial request signal to the HPI to let it know that this transfer will load the address register as well as perform one 32 bit data write cycle to the corresponding DSP.

Block write unit 810 waits for an acknowledge signal to be asserted by the HPI. When the HPI acknowledges that the DSPs HPIA register has been loaded, the block write unit 810 will "prefetch" the first data word to be written and again wait for the acknowledge signal. For subsequent write cycles the block write unit 810 asserts subsequent request signals.

Block write unit 810 uses the message counter to keep track of how many 4 byte words are to be written, and it also uses a word counter to keep track of the number of 4 byte words remaining in this cell. It then determines if another cell is needed to complete the block write operation. When all the words in the current cell have been written, a signal is asserted indicating this. It should be noted that the first cell has a payload of 14 words (56 bytes) and subsequent cells have a payload of 15 words (60 bytes).

When block write unit 810 is finished writing all the words indicated by the message counter, it generates a signal to the SPI to assert the End of Block interrupt, which signal further identifies which bit to assert in the Interrupt 0 vector register.

Block read unit 812 drives the data and control signals to the TX FIFO 704. After reset it generates the necessary control signals to program the almost empty flag to be asserted when less than one cell is in the TX FIFO (64 bytes) and the almost full flag is asserted when less than one cell (64 bytes) can be written. When block read unit 812 receives a start signal from the command processor 808, it loads the cell data message length field into a message counter register, loads the DSP ID field into a register, and stores the entire cell data into the header register.

The block read unit then checks the TX FIFO almost full flag. If there is room for an entire cell it writes the header register and asserts a signal to "prefetch" the read/write DSP address word from the buffer. It asserts the initial request signal to the HPI to let it know that this transfer will load the address register as well as perform one 32 bit data read cycle to the corresponding DSP. If there is no room in TX FIFO 704 for an entire cell, the block read unit 812 "aborts" and the cell is not read.

Block write unit 810 waits for an acknowledge signal to be asserted by HPI 814. When the HPI acknowledges that the DSP HPIA register has been loaded, and the first 4 byte word has been read, block read unit 812 writes the data one byte at a time to the TX FIFO 704. Block read unit 812 uses the word counter to determine when a new cell is started and when to write the header register into the TX FIFO.

When the number of words to read does not fill an integral number of cells, block read unit 812 starts the FILL state machine. Its function is to take over and "fill" up the cell with data while the block read unit 812 indicates to the command processor 808 that it is done.

Host port interface 814 is responsible for arbitrating between the secondary port requests and the block read or block write unit requests. Priority is given to SP requests; however, when the block read or block write units 810, 812 assert their initial request signals, the address and data portions of the transfers are not interruptible by the SPI 806.

The arbiter will first check for SPI requests. If an SP initial request signal is asserted, the opcode bits are checked to determine if the secondary port will perform a memory read/write ("100") or if direct access to the DSP HPI registers is required. For direct access the opcode bits will drive the control bits. For memory transfers, the state machine will indicate HPIA during the address cycle and HPID during data cycle. If the secondary port performs a memory access, the DSP ID is checked against the DSP ID of the last block read or block write transfer and the HIT flag is set if the secondary port access is to the same DSP.

If no SP request is asserted, then the block write and block read request signals are checked. If an initial request is made or the HIT flag is true, then the HPIA address register is loaded and a read or write cycle is performed and the HIT flag is cleared. If a data request transfer is made and the HIT flag is false then there is no need to reload the HPIA register.

The operation of DSE 702 will now be described in more detail. DSP service engine (DSE) 702 is preferably implemented as a service adaptation layer between multi-service engine 614 and DSP controller 706 via PCI bus 616 and the UTOPIA interface 710, respectively. There can be more than one DSE associated with each narrowband card 402, 404. In this example of the invention, each DSE controls eight DSPs and one DSP controller 706 through the UTOPIA interface 710.

DSE 702 provides the following services: process requests from the DSE Control Module (DSECP 640, described in more detail below) and responses to the DSECP 640; forward requests from the DSECP 640 to DSP controller 706 and from DSP controller 706 to the DSECP 640; forward events from DSP controller 706 to the DSECP 640; report DSE's internal events to the DSECP 640; perform Multipath Voice On the Net (MVON) ingress service adaptation on voice packets (from DSPs) based on call setup information, and send adapted packets to multi-service engine 614 (i.e., VoATM: perform AAL2 segmentation, VoIP: add RTP/UDP/IP headers to the voice packet based on H.323, perform packet segmentation then send it to multi-service engine 614, VoFR: adaptation based on FRF.11); perform voice packet egress service adaptation on voice packets (from multi-service engine 614) based on call setup information, de-jitter buffering, and send egress voice packets to the DSPs (i.e. VoATM: perform AAL2 reassembly, VoIP: perform packet reassembly and strip off RTP/UDP/IP headers, reorder voice packet based on H.323, VoFR: adaptation based on FRF.11); provide an interface to DSP controller 706 for transmitting and receiving voice packets via UTOPIA interface 710; provide an interface to multi-service engine 614 for transmitting and receiving voice packets via PCI interface 616.

Figure 9:
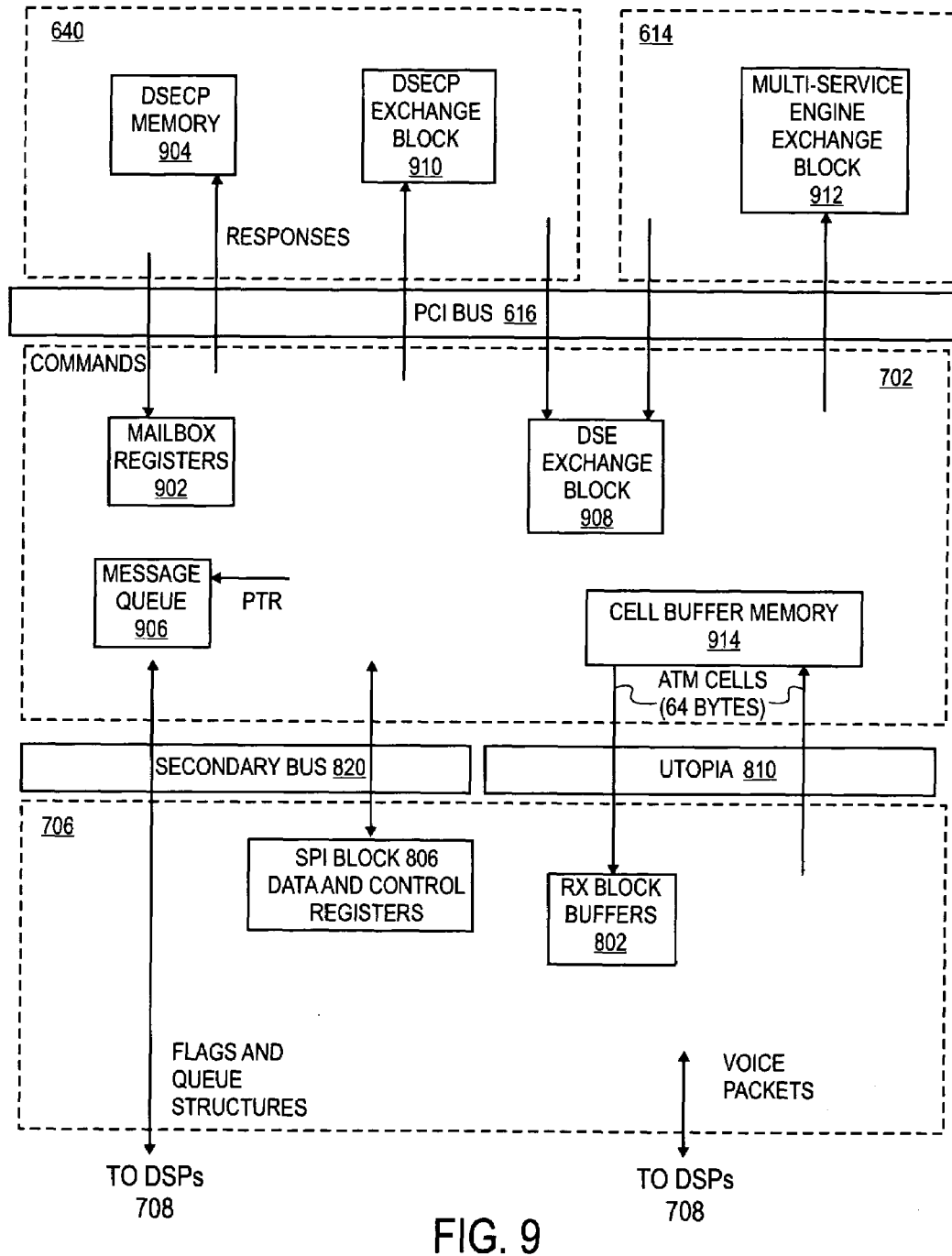
FIG. 9 illustrates the flows of data and messages relating to differential voice services in an exemplary implementation of the present invention.

FIG. 9 further illustrates the data structures and interfaces by which DSE 702 communicates with other functions to perform TDM-based voice call processing.

The interface between DSE 702 and DSECP 640 will now be described in more detail. DSECP 640 issues commands to DSE 702 through the PCI Mailbox registers. DSE 702 sends acknowledgements back to the DSECP 640 by writing responses to the specified DSECP 640 memory. The content of the acknowledgement is the same as the incoming command message except the command/response bit, indicating this command is finished. This fixed memory location in the DSECP 640 has a function similar to a mailbox. The fixed memory location in host is passed to DSE 702 during the boot process. Acknowledgements are written to the fixed memory location rather than the PCI Mailbox so as to reduce the PCI bus traffic. Each entry in the mailbox is a 32 bit word. Only bits 31 through 20 of the word, however, are used to decode the type of the message. The remaining bits are message dependent. Table 2 lists commands that can be sent by DSECP 640 to DSE 702.

TABLE 2

| Command Type | Bits 31–24 | Bits 20–23 | Bits 0–19 | Description |
|---|---|---|---|---|
| CBM Boot Cmd | 0x01 | Exchange ID | Host mailbox address or Status of boot | Host mailbox address, Host->APU Report ATMizer CBM boot status, APU->Host |
| DSE Image Ready | 0x02 | Exchange ID | Image Entry Address | DSE image downloaded By Host |
| DSE Config Cmd | 0x03 | Exchange ID | Configuration structure address or DSE memory map address | Configuration information Host->APU Memory map information APU->Host |
| DSE Enable Cmd | 0x04 | Exchange ID | | DSE to active state, Host->APU |
| DSE Disable Cmd | 0x05 | Exchange ID | | DSE to Standby state, Host->APU |
| DSE Enable Channel | 0x06 | Exchange ID | Bit 0:7 contain DSP channel number. Bit 8:15 contains DSP number. Host Connection Channel parameter is in the Message Exchange Buffer. | Enable DSP channel, Host->DSE Map to SAR's Open cmd |
| DSE Modify Channel | 0x07 | Exchange ID | Bit 0:7 contain DSP channel number. Bit 8:15 contains DSP number. Host Connection Channel parameter is in the Message Exchange Buffer. | Modify DSP Channel, Host->DSE Map to SAR's Config Cmd |
| DSE Disable Channel | 0x08 | Exchange ID | Bit 0:7 contain DSP channel number. Bit 8:15 contains DSP number. | Disable DSP Channel, Host->DSE Map to SAR's Close Cmd |
| Statistic Report | 0x09 | Exchange ID | Target Address | Get Statistic result, Host->APU |
| DSE Trace | 0x10 | Exchange ID | Beginning or Next page | Get DSE's trace |
| Reserved for SAR | 0x11–19 | Exchange ID | | |
| DSE Update ECN | 0x20 | Exchange ID | Bit 0:7 contain DSP channel number. Bit 8:15 contains DSP number. ECN is in the Message Exchange buffer. | Update the ECN for the specified channel. Host->DSE |
| DSE Reset DSP | 0x21 | Exchange ID | DSP number | Reset DSP |
| DSE Read Memory | 0x22 | Exchange ID | DSP Number. The memory address is in message exchange buffer. | Read C6xxx's memory. If DSP number is FF then Host wants to read DSE memory. |
| DSE Write Memory | 0x23 | Exchange ID | DSP Number. The memory address is in message exchange buffer. | Write C6xxx's memory. If DSP number is FF then Host wants to read DSE memory. |
| DSE Send Message | 0x24 | Exchange ID | DSP number. Message is in the message exchange buffer | Send Message to DSP or IOP |
| Enable DSP Thread | 0x25 | Exchange ID | DSP number. Enable flag, sThrName are in the message exchange buffer | Enable/disable a thread in the DSP task kernel. For Diagnostic purpose only. |
| Enable DSP Module | 0x26 | Exchange ID | DSP number. Enable flag, sThdName, sModName are in the message exchange buffer. | Enable/disable a module in the DSP task kernel. For Diagnostic purpose only. |
| Set DSP Group | 0x27 | Exchange ID | DSP number. Channel Number and group name are in the message exchange buffer. | Set a channel in to a group. |
| Load DSP image | 0x28 | Exchange ID | DSP number | Request to load DSP image |
| Run DSP Program | 0x28 | Exchange ID | DSP number | Trigger DSP threads execution |
| DSE Hello | 0x29 | Exchange ID | DSP number | Check to see if DSPs is alive |
| DSE Diagnostic | 0x30 | Exchange ID | DSP number. Diagnostic command and target is in the message exchange buffer | Trigger DSE/DSP Diagnostic command. |

The host mailbox is a 32 bit word located at the beginning of a shared memory location. The host boot code calculates the size required for shared memory by card type, and reserves the bottom of PCI memory as shared memory. The shared memory is on 2 KB alignment.

DSECP 640 initializes the DSE with configuration requirements which are passed to DSE via the Mailbox and the Mail Exchange Box buffer.

DSE 702 uses the configuration information to partition its SDRAM, and to configure the EDMA, Scheduler, Timer and ACI accordingly. DSE constructs its resource data structures and the address of the data structure is passed to DSECP 640 via the DSE Configure response.

The interface between DSE 702 and the DSPs 708 via DSP controller 706 will now be described in more detail.

DSE 702 interfaces with the DSPs via the UTOPIA cell bus 710 and DSP controller 706. ATM cells of 64 bytes are exchanged between DSE 702 and DSP controller 706. The cells include a 48-byte voice packet with a 16-byte header as follows:

| 31 | | | | | 0 |
|---|---|---|---|---|---|
| Rsv | Message length | DSP Number | Sel | MSG Type | Sequence Number |
| Rsv | C6xxx Data Address | | | | Rsv |
| L | S | Packet length | Channel Number | | |
| Voice Data (up to 44 bytes) | | | | | |

Where:

Sequence Number (8 bits): If zero, then the header comprises two words (8-bytes) of defined information, including this word and the next Message Type (3 bits):
 0x0: Reserved
 0x1: Block Write to DSP C6xxx
 0x2: Block Read to DSP C6xxxx
 0x3:7—Reserved.
Selection (2 bits):
 00: Data Cell
 01: Message Cell
 10: Reserved.
 11: Reserved.
DSP number (3 bits): Identifier of source or destination DSP
Packet Length (14 bits): Request Length in words (not including this word)
Rsv (n bits): Reserved for future use
Data Address (19 bits): DSP (C6xxx) Data Address (only defined if Sequence Number is zero).

For cells going from DSE 702 to the DSPs with a non-zero Sequence Number, or for cells going from the DSPs to DSE 702, a one word header format is used (i.e., the word containing the DSP data address is undefined). Moreover, for cells going from the DSPs to DSE 702, the header word containing the message length, DSP number, Sel, and MSG Type fields is created by DSP controller 706 and added to voice packets to form a cell.

As seen above, the voice packet itself includes a 4-byte header, which includes a logical channel number within a DSP, packet length in words, a Silence flag, and a Loss flag. The Silence flag when set to one indicates that the voice has stopped. The Loss flag when set to one indicates that the voice packet has been lost or is damaged. Preferably, the DSP plays out an appropriate voice signal based on the Loss flag using a voice compression algorithm.

The interface between DSE 702 and the DSPs via secondary bus 720 will now be described in more detail.

The DSE accesses the DSPs via the secondary bus to read/write only small numbers of bytes of flags and message queue structures in the DSPs' external DRAM. The DSE performs its accesses via a control register and a data port in the DSP controller's secondary port interface block 806. The DSE writes to the control register prior to a read/write on the secondary bus. In the case of a DSP reset, bits 0–7 of the data port are used to indicate which DSP is requested to be put in or out of reset state. A zero in the data bit will put the corresponding DSP into a reset state. A one in the data bit will put the corresponding DSP out of reset state. The format of the 32-bit control register is as follows:

| 31 | 29 28 | 26 25 | 24 | 23 0 |
|---|---|---|---|---|
| DSP Number | OpCode | O | R | DSP Word Address |

Where:
DSP Number (3 bits): Identifier of DSP for transfer
OpCode (3 bits): Indicates the following type of transfer
 000: DSP Control Register
 001: DSP Address Register
 010: DSP Data R/W with auto-increment, For Diagnostic only
 011: DSP Data R/W without auto-increment, For Diagnostic only
 100: DSP memory location
 101: DSP Reset Control
O (1 bit): Address Offset
 0: DSP word address start from 0
 1: DSP word address start from 80000000
R (1 bit): Method of transfer
 0: Write operation
 1: Read operation The communication of message data between the DSE and DSP's will now be described in more detail.

The DSE maintains a message queue control block in SDRAM to retrieve or send a message. After a message is written to the DSP's memory, the DSE updates a pointer in the DSP's memory structure as well as its local structure. The queue update can be optimized by only reading the pointer in the DSP's memory when the Inbound Message queue is half full.

For outbound messages (from the DSPs to host or DSE), the message buffer is copied in to DSE's memory in one DMA read. After the data transfer is completed, the pHead pointers will be updated to the previous get pointer plus the total length (in words) of all received messages.

The data structures of the exchange blocks 908, 910 and 912 between DSE 702, DSECP 640 and multi-service engine 614 will now be described in more detail.

A pointer is defined in DSECP 640 program bss segmentation. The pointer is initialized to point to the first byte of shared memory before the DSE is initialized. The multi-service engine and DSECP 640 Exchange blocks are allocated in a contiguous portion of the DSE's SDRAM to contain additional parameters that need to be passed from the multi-service engine 614 and DSECP 640 respectively.

The exchange blocks include Ingress and Egress Rings and Ring Descriptors, Buffers and Buffer Descriptors, De-Jitter buffers and descriptors, and Voice channel, host connection, DSE connection and egress connection descriptors, all of which will now be described in more detail. Briefly, these are used to pass information regarding call setup, control and management parameters, as well as the passing of the call data itself. Preferably, the exchange blocks are implemented by SDRAM. However, it should be apparent that other implementations are possible.

The SarEgressRing is located in the DSE's exchange block 908; DseIngressRing is located in the multi-service engine's exchange block. This set of communication rings is used for fast communication between the DSE 702 and multi-service engine 614. The SarEgress's BFD contains the multi-service engine's Local Buffer Number. The DSE has to convert it to its local BFDs number before it can use it. The format of entries in each of the rings is as follows:

| Status | Op Code | Free | Large | Buffer Number |
|---|---|---|---|---|
| Bits 21:31 | Bits 18:20 | 17 | 16 | Bits 0:15 |

Where:
Op Code (3 bits):
 000 Packet Data
 001 Message Data (Reserved)
 010-111 Reserved The DseCpEgressRing is located in DSECP's exchange block 910 and DseCpIngressRing is located in the DSE's exchange block 908. This set of communication rings is used for fast communication between DSECP 640 and DSE messaging. The ring entry format is the same as above. There are two ring descriptors per ring. One ring descriptor is owned and maintained by the writer and the other by the reader.

The buffer descriptor (BFD) is used to track information about the data buffers associated with a given channel connection. It is attached to the Virtual Connection Descriptor (VCD) for segmentation or reassembly. The format of the buffer descriptor is as follows:

| BFD Control | BFD_UU | Connection Number (ECN) |
| --- | --- | --- |
| Buffer Size | | Next BFD |
| PBuffData.PCI | | |
| PBuffData.Sec | | |

Note:

BFD_FreeSel: APU uses this field to indicate which free list (0–5) that BFD is allocated.

BFD_DIR: TX or RX

If PBuffData.PCI and PBuffData.Sec are non-zero then BFD is in "packet mode" and data will be copied from PCI in to secondary memory on a TxBuff command.

The Format of the BFD control byte in the buffer descriptor is as follows:

| Buff continue | EFCI | CLP | Buffer Free | Buffer Large | Error Abort | Error Length | Error CRC |
| --- | --- | --- | --- | --- | --- | --- | --- |

There is one De-Jitter Buffer Descriptor Table per channel connection. There are 2048 entries in the De-Jitter Buffer Descriptor Table. Each 4-byte entry contains the BFDs number and a time stamp. This table is used for two purposes: to organize Voice packets in the order of RTP sequence numbers; and to provide a De-jitter Buffer for Voice.

If a Voice packet arrives after the Current pointer, it is considered as being lost and will be discarded immediately. The details of the De-jitter Buffer Descriptor table are not necessary for an understanding of the invention.

The DSE 702's exchange block 908 includes two types of Virtual Connection Descriptors (VCD)—Ingress VCDs and Egress VCDs. Ingress VCDs are created at system initialization time. There are 33 Ingress VCDs per DSP. The 33$^{rd}$ Ingress VCD for each DSP is used to read messages from the DSP. The Buffer Descriptor (BFD) is attached to the VCD when the voice cells are re-assembled by the DSE. When a voice packet is re-assembled, the BFD will be detached from the VCD linked list and will be processed by the DSE (e.g. attaching IP/UDP/RTP headers for VoIP). The DSE then places the BFD numbers into the SarIngressRing for transmission on to the network.

The Egress VCD is created when the DSPs are reset and loaded with the image. There are four Egress VCDs created per DSP: a WriteEgress VCD, a ReadEgress VCD, a MsgEgressVCD and an ExtraWrEgress VCD. The four Egress VCDs are used to send Block write or Block read commands to the DSP controller on the UTOPIA interface. Thus, 32 Egress VCDs are needed for the Egress direction. The ExtraWrEgress VCD is used only when there are voice packets ready to be sent in each of the active channels within a given DSP.

The Host Connection Parameter is defined as follows. DSECP 640 passes the following parameter to DSE 702 with an Enable Channel Command. The DSE responds by setting up a corresponding HCD structure for the specified channel connection, which is defined as follows.

```
typedef struct {
    SAPID_t          sapId;          /* platform control SAP identifier */
    U32_t            txnId,          /* transaction ID */
    U8_t             PortNum;        /* Logical port Number */
    U8_t             ChanDirection;  /* Channel Direction. 0: Ingress; 1:
                                        Egress; 2: Full duplex */
    TCG_PKTN_TYPE_t  pktnType,       /* packetization type. VOIP,
                                        VOATM, VOFR*/
    TOS_t            tos,            /* type of service */
    IP_ADDR_t        *remIpAddr,     /* remote IP Address */
    PORT_t           remRtpPort,     /* remote RTP port */
    AUDIO_CONF_t     *remAudioConf,  /* remote audio configuration */
    AUDIO_CONF_t     *remAudioCap    /* remote audio capability */
    U16_t            ECN;            /* Logical Connection number */
} HCD_t, *pHCD_t;
```

The DSE Connection Descriptor (DCD) is defined as follows:

```
typedef struct {
    HCD_t     hcdCfg;           /* Host connection
                                   Configuration */
    DCDCFG_t  dcdCfg;           /* DSE Connection
                                   Configuration */
    void      qCountPtr,        /* Counter of BFDs are queued */
    U32_t     ingrComplLen;     /* Number of RxCell completion */
    U32_t     ingrPacketCnt;    /* Number of Packet received */
    U32_t     ingrByteCnt;      /* Number of Byte received */
    U32_t     ingrPacketDrpCnt; /* Number of Packet Dropped */
    U32_t     egrComplLen;      /* Number of RxCell completion */
    U32_t     egrPacketCnt;     /* Number of Packet received */
    U32_t     egrByteCnt;       /* Number of Byte received */
    U32_t     egrPacketDrpCnt;  /* Number of Packet Dropped */
} DCD_t, *pDCD_t;
Where:
typedef union {
    struct {
        U8_t  ConState;         /* State of the Channel Connection */
        U8_t  AAL_type;         /* AAL type 1, 2 or 5 */
        U8_t  dspNum;           /* DspNumber */
        U8_t  ChanNum;          /* Logical Dsp Chan Number 0–31 */
                                /* Channel 32 is reserved for Msg */
    } cfgMBits;
    U8_t cfgMap;
} DCDCFG_t;
```

The DSE Connection table is a single dimensional array of DCD parameters that is indexed by the DSP (0–7) number and the channel number (0–31). This table is maintained by the DSE to collect status on all existing connections.

The Egress Connection Descriptor (ECD) is defined as follows. Egress Connection Descriptor is a 32-byte structure used to send cells to the DSPs via the UTOPIA interface. The ECD is indexed by the DSP number and the Egress VCD type.

```
typedef struct {
    U8_t    type;           /* Write, Read or Message */
    U8_t    SkipNewHdr;     /* When set to one, don't load new cell
                               header */
    U8_t    SequenceNum;    /* Next Sequence Number */
    U8_t    pad;            /* Padding */
    U32_t   CurrentCellHdr; /* Header loaded from the data field */
    U32_t   egrPacketCnt;
    U32_t   egrPacketDrpCnt; /* Number of Packet Dropped */
    U32_t   ingrTdmByteLoss; /* Total TDM byte loss from bad cell
                               sequence */
    U32_t   ingrMsgByteLoss; /* Total Incomming message byte
                               loss */
    U32_t   rsv10[4];
} ECD_t, *pECD_t;
typedef struct {
    U8_t    DspNumber;
    U8_t    Channel Number;
} ECN_PAR_t;
```

The DSE ECN table is a single dimensional array that indexes ECDs by the ECN number.

The DSE Statistics Data Structure is defined as follows. When DSECP 640 requests a statistic report with a buffer to hold the statistics information, the DSE 702 copies the statistic data from its exchange block to the DSECP's through an EDMA move command request. When the EDMA move is complete, the DSE issues a response to the statistics command via the host mailbox. The DSE Statistic structure is identical to the SAR's statistic structure, and is as follows.

```
typedef struct {
    U8_t        blkWritePend;  /* Block Write Pending */
    U8_t        blkWriteType;  /* Write, Read or Message */
    t_knlData   mpKrnlData;    /* DSP Task kernel structure */
} dspBlk_t, *pdspBlk_t;
```

An example for designing the overall buffer size required for the exchange blocks in the DSE, multi-service engine and DSECP in accordance with the invention will now be described.

In a preferred implementation of the invention, up to 240 channels (DS0) per DSE can be opened simultaneously. This value determines the allocation of different memory blocks as described hereinbelow.

To calculate the buffer requirements, the following implementations are taken into account. All 8 DSPs are used for single service and the Ingress rate is 30 packets per 10 ms. Accordingly, the total number of packets per second is 30×8×100 ms/sec=24000 Packets/Second. The average packet size is 84 bytes, and the cell size on the UTOPIA bus is 64 bytes. The average buffer queuing time is 100 milliseconds. Each DSP runs one TDM and one network thread per 10 ms, and there is maximum 30 channel connections at a given time on a DSP. These implementation details yield the following requirements:

Packet Rate: 30×8×100=24000 Packets/Second.
Buffer Count: 24000*100/1000=2400 buffers.
TxRing Count: 24000*10/1000=240 entries~256 entries For the ingress direction (DSE->multi-service engine or DSECP->DSE), the Buffers, the BFDs and the TxRing are located in the multi-service engine 912 or DSE exchange block 908. The BFD is 16 bytes, and there are 2400 buffers so we need:

DSE (SarIngressBFD): 16*2400=38,400 Bytes (DSE exchange block)

Multi-service engine (DseIngressBFD): 16*2400=38,400 Bytes (multi-service engine exchange block)

Meanwhile, the IngressRing is 4 bytes, so we need:

Multi-service engine (DseIngressRing): 4*256=1,024 Bytes (multi-service engine exchange block)

The Ingress buffer for DSE's packet is 84 bytes. For VoIP, for example, the packet headers overhead adds 40 more bytes. A voice packet could span cross 3 cells. The above yields a data buffer size of (3×60+40)=220 bytes. Accordingly, the memory requirement is:

Multi-service engine (DseBuffer): 220*2400=528,000 Bytes (multi-service engine exchange block)

For the egress direction, the BFDs are located in the DSE and multi-service engine exchange blocks. The BFD is 16 bytes, and there are 2400 buffers so we need:

DSE (SarEgressBFD): 16*2400=384,000 Bytes (DSE exchange block)

Multi-service engine (DseEgressBFD): 16*2400=384,000 Bytes (Multi-service engine exchange block)

The EgressRing is 4 bytes, so we need:

DSE (SarEgressRing): 4*256=1024 Bytes (DSE exchange block)

For the Dejitter table:

(30 channels×4 byte×2048)×8 DSPs=1,966,080 bytes.

The Egress buffer for DSE's packet is 84 bytes. For VoIP, the packet headers overhead adds 40 more bytes. Thus the DSP packet size is 144 bytes DSE Data Buffer: 144*2400=345,600 Bytes (DSE exchange block)

The VCDs, DCDs, ECDs and HCDs are located in the multi-service engine exchange block. The size of VCD, ACD and HCD entries are 32 bytes, 216 bytes and 32 bytes, respectively. Accordingly, the memory requirement is as follows:

VCDs: (32×8+4*8)×32 bytes=9,216 Bytes
DCDs: 32×8*256 bytes=65,536 Bytes
ECDs: 32×32 Bytes=1,024 Bytes
HCDs: 32*32 bytes=1,024 Bytes The DSE Image and data segment are located in the DSE exchange block.

DSE Image and Data: =16 KB.

DSE is allocated 64 KB of trace information that can be uploaded to the DSECP (host) for debugging.

Given all the above implementation details, the total memory required to implement the exchange blocks is about 4 MB.

The DSE's Cell Buffer Memory 914 holds the cells to/from the Utopia Port. The ACI, which is the ATMizer-II Tx/Rx port, uses a 4 byte Cell Descriptor in front of a cell in Cell Buffer Memory to manage its transmit and receive operations. In the receiving (ingress) direction, 8 cells are reserved. In the transmitting (egress) direction, 40 cells are reserved. 4 cells are reserved for VoIP headers. One idle cell, and one error cell is reserved. The total memory used for cells in Cell Buffer Memory is thus (8+40+4+1+1)*(68) =3672 bytes.

In an embodiment of the invention, the ring descriptors and statistics data are also located in the Cell Buffer Memory 914, rather than in the exchange block. Each ring descriptor is 16 bytes. There are 2 ring descriptors for transmit and receive, the total memory for ring descriptors is thus 4*16+ 96=160 bytes, because the statistics data requires 96 bytes.

Figure 10:
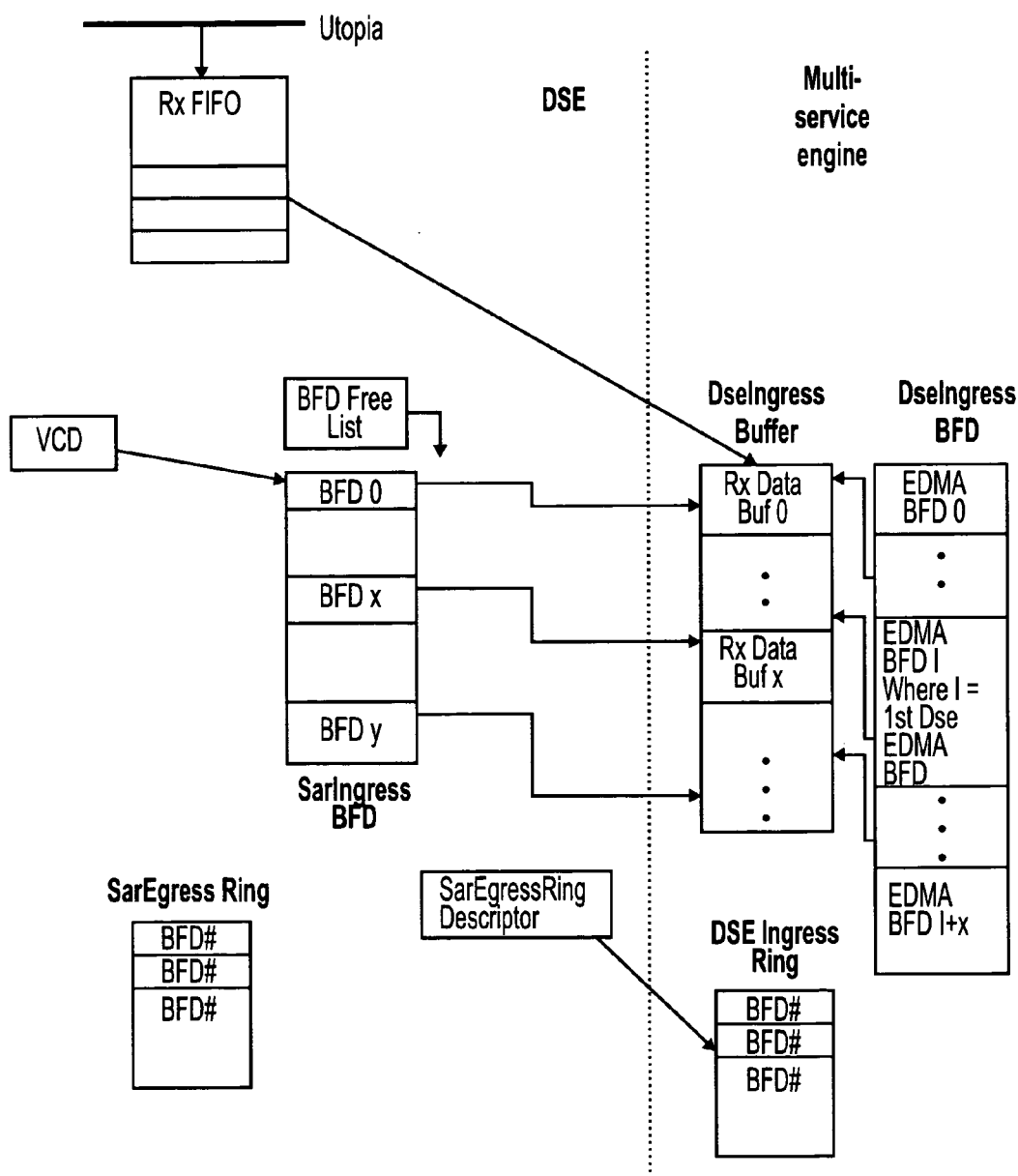
FIG. 10 illustrates the flow of ingress voice data in accordance with the principles of the present invention.

The operation of DSE 702 for transferring ingress flows of voice data from the DSPs 708 to multi-service engine 614 is further illustrated in FIG. 10.

When incoming voice data arrives on a line associated with one of the DSPs 708, a TDM interrupt is triggered by the DSP to notify the DSE that voice packets for a given DSP are ready for transmission on the network. DSE 702 builds a Block read Request cell and sends it to the DSP controller 706. Incoming cells from the DSP via the Utopia bus are buffered in the DSE's RX buffer 802 and will be reassembled in the multi-service engine's DseIngress data buffer. There is one voice packet per buffer (per BFD). The 4-byte header in the voice packet is stripped off by DSE 702 and additional headers in the buffer might be added, depending on the type of packetization (i.e. VoIP). The Ingress VCD/BFD will be used to reassemble voice cells into voice packets. The number of the DSE's SarIngressBfd is equal to the number of multi-service engine's DseIngressBfd. Once the buffer is filled with one voice packet and the headers are added (if applicable) the DSE signals the multi-service engine via the DseIngressRing in the multi-service engine exchange block. The BFD number needs to be adjusted to the SAR's BFDs number before written in to the SAR's DseIngressRing. The DSE also writes the ECN, BFD control, pBuffData. PCI (adjusted to multi-service engine's PCI address space) in to the multi-service engine's DseIngressBfd.

The multi-service engine then picks up the BFD number from its DseIngressRing, clears the ring entry with zero, advances the get pointer, moves the packet data from the DSE's memory in to multi-service engine's memory and then transmits it on to the network. When the voice packet is transmitted, the multi-service engine writes this BFD number back in to the DSE's SarEgressRing with the Buffer Free flag set to one. The DSE will free the buffer pointed by the BFD (needs to convert to DSE's BFD number) back to the buffer free pool.

Figure 11:
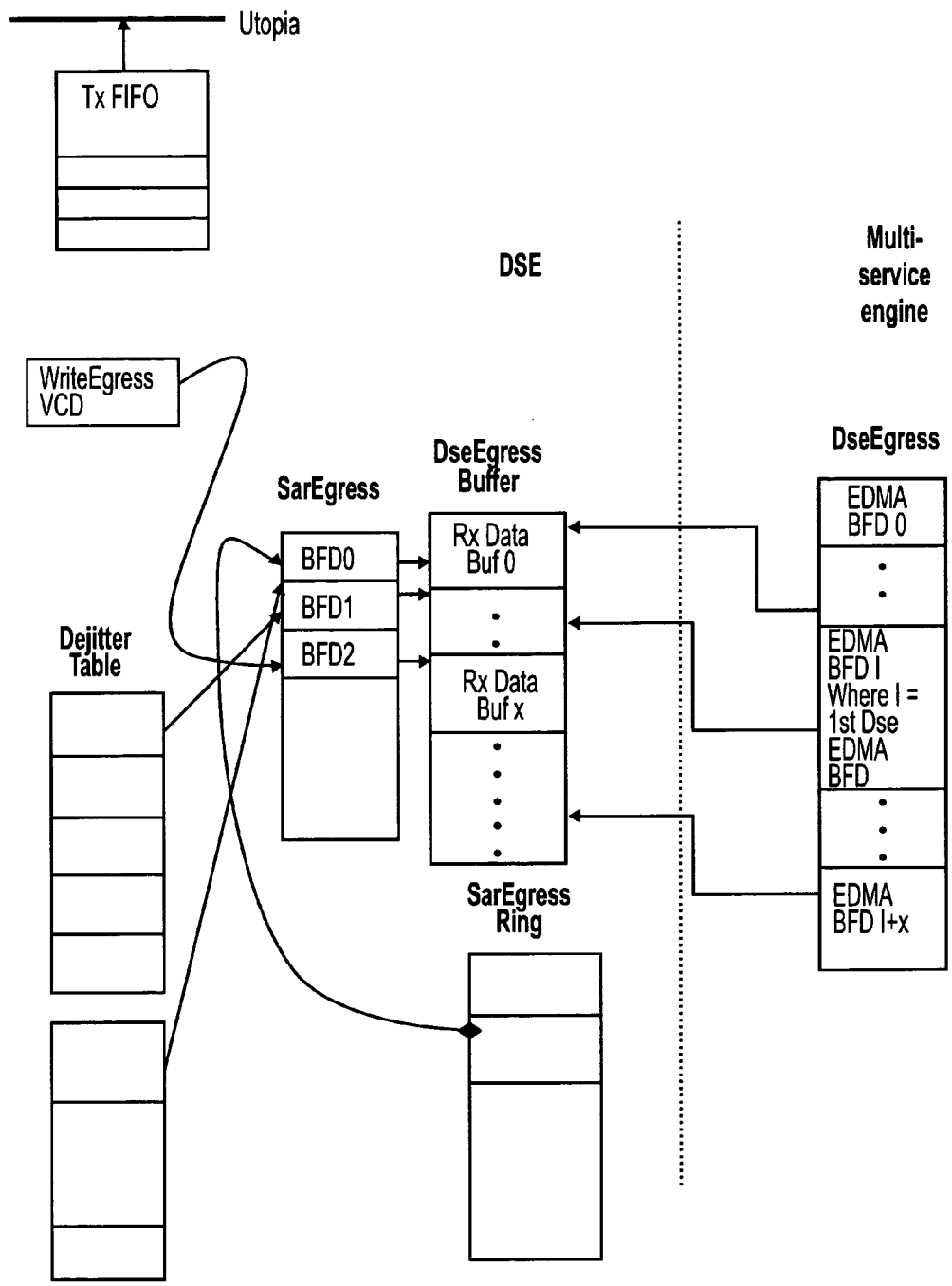
FIG. 11 illustrates the flow of egress voice data in accordance with the principles of the present invention.

The operation of DSE 702 for transferring egress flows of voice data from multi-service engine 614 to DSPs 708 is further illustrated in FIG. 11.

Outgoing voice packets from the multi-service engine will be assembled in the DSE's SarEgress data buffer. There is one voice packet per buffer (BFD). The voice packet might have additional headers in the buffer depending on the type of packetization (i.e. VoIP) which will be checked by the DSE. Once one voice packet is assembled, the multi-service engine will write the BFD number in to the DSE's SarEgressRing. It also updates the DSE's SarEgress BFD with the ECN, pBuffData. PCI. The DSE then picks up the BFD number from its SarEgressRing (and adjusts the BFD number to local number), clears the ring entry with zero, advances the get pointer.

The DSE gets the ECN from the BFD and uses the ECN lookup table to get the DSP#, Voice Channel Number, and packetization type. DSE 702 performs a header checksum for applicable packetization type. The BFD will be modified to get a new connection number, which is the DSP number, and adjusts the data pointer to point to the voice packet without the header portion. The DSE performs a De-jitter function on the received voice packet and waits for the Network Trigger Interrupt from the DSP. When Network interrupt is requested for a specified DSP, the DSE collects the available voice packet in each of the channel's de-jitter buffers and queues it on to the requested DSP's WriteEgress VCD. The WriteEgress VCD/BFD is used for segmenting voice packets into cells and transmitting on the UTOPIA interface. Once the voice packet is transmitted, the DSE writes the BFD number back in to the multi-service engine's DseIngressRing with the Buffer Free flag set to one. The multi-service engine will free the buffer pointed by the BFD back to the buffer free pool. The ExtraWriteEgress VCD is used to move additional voice packets (if any) from the De-jitter buffer to the DSP (C6xxxx) BEFORE the DSP generates a Network interrupt. This option allows higher utilization of the DSP controller's DMA given that there could be more than two voice packets available in every channel that is active for a given DSP.

An example of call server 204 in accordance with the invention will now be described in more detail.

Briefly, call server 204 performs all call signaling functions and maintains information about the resources within switch apparatus 202, as well as information about service plans of customers.

Conceptually, the physical resources within switch apparatus 202 are grouped hierarchically. Within the switch apparatus, there are a number of "modules" that are coupled to both broadband and narrowband networks, and a list of these "modules" and their identifying information is maintained. For each "module," there is an associated number of "lines" (for example, E1/T1 lines) that are coupled to networks. A list of these "lines" as well as descriptions of their type and capabilities are maintained. Associated with each "line" the call server maintains a set of E164 addresses (i.e. "party numbers") that is used to map addresses to trunk groups, for example. Moreover, each "line" can have a corresponding number of "channels" that can individually or collectively be used during a call. A list of these "channels" and their identifying characteristics is also maintained.

By virtue of these lists, the call server knows how a voice call placed, for example, on a user connected by a DS0 associated with one of the narrowband cards 402, 406, and destined, for example, on an IP network user associated with a broadband card 410, should be routed within switch apparatus 202. Moreover, as will be described in more detail below, call server 204 has the ability to maintain service plan profiles for individuals or groups of users to determine the QoS requirements and egress media type adaptation to be applied to the voice call. Call server 204 relays this information to software processes executing in SCC 412 of the switch apparatus, which in turn communicates the information to the respective VC controller 608 and voice/fax controller 626 (or HDLC controller 618 and ATM cell controller 620) associated with the ingress and egress ends of the call within switch apparatus 202.

Call server 204 also performs signaling functions for all voice calls traversing switch apparatus 202. Generally, inband signaling is detected by switch apparatus 202 and relayed to call server 204. Call server 204 determines, from the called party number and routing table, for example, whether any relay functions need to be performed (e.g. when an ISDN call signaled via SS7 needs to go across the Internet, to be signaled via H.323). Call server 204 handles the signaling functions for the call before setting up the switch path through switch apparatus 202, determining the quality of service requirements and media adaptations that need to be performed based on service plan profiles and/or instantaneous switch resources and costs, and then relaying this information to the necessary processes and cards in switch apparatus 202.

As set forth above, the details of call server 204 are mainly functional and involve the interoperation of software processes executing on both call server 204 and switch apparatus 202.

FIG. 12 further illustrates the software load respectively existing on external call server 204 and switch apparatus 202 for setting up and managing calls through switch apparatus 202.

As can be seen, the software processes executing on external call server 204 include network management, CDR Gen, service plan manager, external API, switch resource manager, ingress and egress session control, session control interface, ISDN and Q.SIG call control, CAS call control, H.323 stack and call control, SS7 stack and call control, and MSCP master.

Network management communicates with an external network management server for service provising, device management, and fault management, etc.

CDR Gen communicates with an external billing server for generating and maintaining realtime billing records based on calls placed through switch apparatus 202. CDR Gen can be implemented in various ways known to those skilled in the art, and a detailed description thereof is not necessary for an understanding of the present invention.

Service plan manager communicates with an external service plan management server to get the subscriber's service plan based on calling party number.

External API communicates with external applications for telephony service creation.

Switch resource manager maintains a list of all resources in switch apparatus 202, such as lines and trunks.

Ingress and egress session control communicates with switch resource manager, service plan manager, and session control interface for setting up or tearing down a call.

Session control interface is a generic interface between session control and various call control modules, such as ISDN and Q.SIG call control, CAS call control, H.323 stack and call control, and SS7 stack and call control.

MSCP master provides an interface between software processes executing on call server 204 and switch apparatus 202.

ISDN and Q.SIG call control, CAS call control, H.323 stack and call control, SS7 stack and call control, provide signaling functions for calls placed via switch apparatus 202 and ISDN and other public and private networks. These signaling functions are well understood by those skilled in the art and a detailed description thereof is unnecessary for an understanding of the present invention.

As can be further seen, the software processes executing on switch apparatus 202 include MSCP slave, call platform control, ATM route management, IP route management, telephony control module, switch control module CAS state machine and ISDN Q.SIG Stack.

MSCP slave provides an interface between software processes executing on call server 204 and switch apparatus 202.

ATM route management performs route maintenance and lookup functions for attached ATM networks. These route management functions are well understood by those skilled in the art and a detailed description thereof is unnecessary for an understanding of the present invention.

IP route management performs route maintenance and lookup functions for attached ATM networks. These route management functions are well understood by those skilled in the art and a detailed description thereof is unnecessary for an understanding of the present invention.

CAS state machine and ISDN Q.SIG stack perform signalling stack functions for attached ISDN and other public and private networks. These signalling stack functions are well understood by those skilled in the art and a detailed description thereof is unnecessary for an understanding of the present invention.

Call platform control communicates with ATM route management, IP route management, telephony control module, switch control module, CAS state machine and ISDN Q.SIG stack for seting up and tearing down a call.

Telephony control module communicates with TSI driver, the DSPs and DSE 702 for controlling the processing and switching of voice calls through switch apparatus 202.

Switch control module provides services to MPLS controller, PNNI controller, and MIB function through a generic API. On the other side, Switch control module makes use of the services provided by End Point Management, Switch Driver, and Cross Connection Management to set up or tear down a virtual connection within the switch.

Although the present invention has been described in detail with reference to the preferred embodiments thereof, those skilled in the art will appreciate that various substitutions and modifications can be made to the examples described herein while remaining within the spirit and scope of the invention as defined in the appended claims.

What is claimed is:

1. A carrier class switch apparatus comprising:
    means for receiving voice calls having TDM voice/fax, VoIP, VoATM and VoFR media types, said means for receiving a voice call having a first media type and a first signaling type corresponding to said first media type;
    means for converting voice calls to TDM voice/fax, VoIP, VoATM and VoFR media types, said means for converting said voice call to a second media type different than said first media type;
    means for determining said second media type in accordance with instantaneous availability of bandwidth resources;
    means for relaying signaling associated with said voice call of said first signaling type to a second signaling type corresponding to said second media type; and
    means for forwarding said voice call having said second media type.

2. An apparatus according to claim 1, wherein said means for receiving a voice call includes means for receiving said voice call at a first interface of said switch apparatus, said first interface being one of a broadband interface and a narrowband interface, and wherein said means for forwarding said voice call includes means for forwarding said voice call at a second interface of said switch apparatus, said second interface being one of said broadband interface and said narrowband interface.

3. An apparatus according to claim 1, further comprising:
    means for associating said voice call with a quality of service requirement that is specific to said voice call.

4. An apparatus according to claim 3, further comprising:
    means for determining said quality of service requirement in accordance with a service plan profile specific to said calling party associated with said voice call.

5. An apparatus according to claim 2, further comprising:
    means for switching packets associated with said voice call between said first interface and said second interface.

6. An apparatus according to claim 5, further comprising:
    means for converting said voice call into said packets having an intermediate switching media type.

7. An apparatus according to claim 6, wherein said intermediate switching media type is ATM cells.

8. An apparatus according to claim 5, further comprising:
means for associating said voice call with a quality of service requirement, said means for switching packets associated with said voice call being adapted to switch said packets at a rate corresponding to said quality of service requirement.

9. An apparatus according to claim 8, further comprising:
means for determining said quality of service requirement in accordance with a service plan profile specific to said calling party associated with said voice call.

10. A method of providing differential voice over the network services in a carrier class switch apparatus comprising:
receiving a voice call having a first media type with a broadband interface receiving TDM voice/fax, VoIP, VoATM and VoFR media types, said voice call having a first signaling type corresponding to said first media type;
converting said voice call to a second media type different than said first media type, said second media type being any one of TDM voice/fax, VoIP, VoATM and VoFR media types;
determining said second media type in accordance with instantaneous availability of bandwidth resources;
relaying signaling associated with said voice call of said first signaling type to a second signaling type corresponding to said second media type; and
forwarding said voice call having said second media type.

11. A method according to claim 10, wherein said step of receiving said voice call includes receiving said voice call at a first interface of said switch apparatus, said first interface being one of a broadband interface and a narrowband interface, and wherein said step of forwarding said voice call includes forwarding said voice call at a second interface of said switch apparatus, said second interface being one of said broadband interface and said narrowband interface.

12. A method according to claim 10, further comprising:
associating said voice call with a quality of service requirement.

13. A method according to claim 12, further comprising:
determining said quality of service requirement in accordance with a service plan profile of said calling party associated with said voice call.

14. A method according to claim 11, further comprising:
switching packets associated with said voice call between said first interface and said second interface.

15. A method according to claim 14, further comprising:
said voice call into said packets having an intermediate switching media type.

16. A method according to claim 15, wherein said intermediate switching media type is ATM cells.

17. A method according to claim 14, further comprising:
associating said voice call with a quality of service requirement, said step of switching packets associated with said voice call being performed so as to switch said packets at a rate corresponding to said quality of service requirement.

18. A method according to claim 17, further comprising:
determining said quality of service requirement in accordance with a service plan profile specific to said calling party associated with said voice call.

19. A carrier class switch apparatus integrated in a single switching platform comprising:
a switching fabric adapted to switch packets between a plurality of broadband switching ports;
a broadband interface coupled to one of said plurality of broadband switching ports, said broadband interface being adapted to communicate voice calls between said switching fabric and a broadband connection, said broadband interface with said broadband connection communicating TDM voice/fax, VoIP, VoATM and VoFR media types;
a local switch module coupled to another one of said plurality of broadband switching ports;
a narrowband interface coupled to said local switch module, said narrowband interface being adapted to communicate voice calls between said switching fabric and a narrowband connection, said narrowband interface capable of communicating TDM voice/fax, VoIP, VoATM and VoFR media types;
a switch control card coupled to said broadband interface and said narrowband interface, said switch control card being adapted to relay signaling associated with a voice call between said broadband connection and said narrowband connection, said voice call having a first signaling type corresponding to a first media type at said broadband connection and a second signaling type corresponding to a second media type different than said first media type at said narrowband connection; and
a call server coupled to said switch control card to determine said second media type in accordance with a service plan profile of a calling party associated with said voice call.

20. An apparatus according to claim 19, wherein said switch control card is further adapted to route and manage virtual circuit connections between said plurality of broadband switching ports associated with said voice call in accordance with a quality of service requirement for said voice call.

21. An apparatus according to claim 19, wherein said narrowband interface further includes a voice/fax controller that converts packets associated with said voice call between said second media type and said fist media type.

22. An apparatus according to claim 21, wherein said voice/fax controller includes:
a plurality of digital signal processors that convert between digitized voice/fax streams associated with said voice call for communication, by said narrowband connection and voice/fax packets for communication by said switching fabric;
a DSP service engine that repacketizes said voice/fax packets received from and sent to said digital signal processors in accordance with said first media type; and
a digital signal processor controller that controls packet communication between said digital signal processors and said DSP service engine.

23. An apparatus according to claim 21, wherein said narrowband interface further includes a multi-service engine that converts said packets between said second media type and an intermediate switching media type of said switching fabric.

24. An apparatus according to claim 23, wherein said intimidate switching media type is ATM cells.

25. An apparatus according to claim 22, wherein said narrowband interface further includes a multi-service engine that communicates with said DSP service engine and converts said packets between said second media type and an intermediate switching media type of said switching fabric.

26. An apparatus according to claim 20, wherein said narrowband interface further includes:
a voice/fax controller that converts packets associated with said voice call between said second media type and said first media type; and a multi-service engine that converts said packets between said second media type and an intermediate switching media type of said switching fabric.

27. An apparatus according to claim 26, wherein said narrowband interface further includes:
a virtual circuit queue for buffering said packets between said voice/fax controller and said switching fabric; and
a SAR engine for servicing said virtual circuit queue in accordance with said quality of service requirement.

28. A computer-readable medium having a sequence of instructions, the sequences of instructions, when executed by a processor, causing the processor to perform a method of providing differential voice over the network services in a carrier class switch apparatus, the method comprising:
receiving a voice call having a first media type being any one of TDM voice/fax, VoIP, VoATM and VoFR, and a first signaling type corresponding to said first media type;
converting said voice call to a second media type different than said first media type, said second media type being any one of TDM voice/fax, VoIP, VoATM and VoFR media types;
determining said second media type in accordance with instantaneous availability of bandwidth resources;
relaying signaling associated with said voice call of said first signaling type to a second signaling type corresponding to said second media type; and
forwarding said voice call having said second media type.

29. The computer-readable medium according to claim 28, wherein receiving said voice call includes receiving said voice call at a first interface of said switch apparatus, said first interface being one of a broadband interface and a narrowband interface, and wherein forwarding said voice call includes forwarding said voice call at a second interlace of said switch apparatus, said second interface being one of said broadband interface and said narrowband interface.

30. The computer-readable medium according to claim 28, wherein the method further comprises:
associating said voice call with a quality of service requirement.

31. The computer-readable medium according to claim 30, wherein the method further comprises:
determining said quality of service requirement in accordance with a service plan profile of said calling party associated with said voice call.

32. The computer-readable medium according to claim 29, wherein the method further comprises:
switching packets associated with said voice call between said first interface and said second interface.

33. The computer-readable medium according to claim 32, wherein the method further comprises:
converting said voice call into said packets having an intermediate switching media type.

34. The computer-readable medium according to claim 33, wherein said intermediate switching media type is ATM cells.

35. The computer-readable medium according to claim 32, wherein the method further comprises:
associating said voice call with a quality of service requirement, said switching packets associated with said voice call being adapted to switch said packets at a rate corresponding to said quality of service requirement.

36. The computer-readable medium according to claim 35, wherein the method further comprises:

determining, said quality of service requirement in accordance with a service plan profile specific to said calling party associated with said voice call.

37. A carrier class switch apparatus comprising:
means for receiving voice calls having TDM voice/fax, VoIP, VoATM and VoFR media types, said means for receiving a voice call having a first media type and a first signaling type corresponding to said first media type;
means for converting voice calls to TDM voice/fax, VoIP, VoATM and VoFR media types, said means for converting said voice call to a second media type different than said first media type;
means for determining said second media type in accordance with a service plan profile specific to a calling party associated with said voice call;
means for relaying signaling associated with said voice call of said first signaling type to a second signaling type corresponding to said second media type; and
means for forwarding said voice call having said second media type.

38. An apparatus according to claim 37, wherein said means for receiving a voice call includes means for receiving said voice call at a first interface of said switch apparatus, said first interface being one of a broadband interface and a narrowband interface, and wherein said means for forwarding said voice call includes means for forwarding said voice call at a second interface of said switch apparatus, said second interface being one of said broadband interface and said narrowband interface.

39. An apparatus according to claim 37, further comprising:
means for associating said voice call with a quality of service requirement that is specific to said voice call.

40. An apparatus according to claim 39, further comprising:
means for determining said quality of service requirement in accordance with said service plan profile.

41. An apparatus according to claim 38, further comprising:
means for switching packets associated with said voice call between said first interface and said second interface.

42. An apparatus according to claim 41, further comprising:
means for converting said voice call into said packets having an intermediate switching media type.

43. An apparatus according to claim 42, wherein said intermediate switching media type is ATM cells.

44. An apparatus according to claim 41, further comprising:
means for associating said voice call with a quality of service requirement, said means for switching packets associated with said voice call being adapted to switch said packets at a rate corresponding to said quality of service requirement.

45. An apparatus according to claim 44, further comprising:
means for determining said quality of service requirement in accordance with said service plan profile.

46. A method of providing differential voice over the network services in a carrier class switch apparatus comprising:
receiving a voice call having a first media type with a broadband interface receiving TDM voice/fax, VoIP, VoATM and VoFR media types, said voice call having a first signaling type corresponding to said first media type;

converting said voice call to a second media type different than said first media type, said second media type being any one of TDM voice/fax, VoIP, VoATM and VoFR media types;

determining said second media type in accordance with a service plan profile specific to said calling party associated with said voice call;

relaying signaling associated with said voice call of said first signaling type to a second signaling type corresponding to said second media type; and forwarding said voice call having said second media type.

47. A method according to claim 46, wherein said step of receiving said voice call includes receiving said voice call at a first interface of said switch apparatus, said first interface being one of a broadband interface and a narrowband interface, and wherein said step of forwarding said voice call includes forwarding said voice call at a second interface of said switch apparatus, said second interface being one of said broadband interface and said narrowband interface.

48. A method according to claim 46, further comprising: associating said voice call with a quality of service requirement.

49. A method according to claim 48, further comprising: determining said quality of service requirement in accordance with said service plan profile.

50. A method according to claim 47, further comprising: switching packets associated with said voice call between said first interface and said second interface.

51. A method according to claim 50, further comprising: said voice call into said packets having an intermediate switching media type.

52. A method according to claim 51, wherein said intermediate switching media type is ATM cells.

53. A method according to claim 50, further comprising: associating said voice call with a quality of service requirement, said step of switching packets associated with said voice call being performed so as to switch said packets at a rate corresponding to said quality of service requirement.

54. A method according to claim 53, further comprising: determining said quality of service requirement in accordance with said service plan profile.

55. A computer-readable medium having a sequence of instructions, the sequences of instructions, when executed by a processor, causing the processor to perform a method of providing differential voice over the network services in a carrier class switch apparatus, the method comprising:

receiving a voice call having a first media type being any one of TDM voice/fax, VoIP, VoATM and VoFR, and a first signaling type corresponding to said first media type;

converting said voice call to a second media type different than said first media type, said second media type being any one of TDM voice/fax, VoIP, VoATM and VoFR media types;

determining said second media type in accordance with a service plan profile specific to a calling party associated with said voice call;

relaying signaling associated with said voice call of said first signaling type to a second signaling type corresponding to said second media type; and forwarding said voice call having said second media type.

56. The computer-readable medium according to claim 55, wherein receiving said voice call includes receiving said voice call at a first interface of said switch apparatus, said first interface being one of a broadband interface and a narrowband interface, and wherein forwarding said voice call includes forwarding said voice call at a second interface of said switch apparatus, said second interface being one of said broadband interface and said narrowband interface.

57. The computer-readable medium according to claim 55, wherein the method further comprises:
associating said voice call with a quality of service requirement.

58. The computer-readable medium according to claim 57, wherein the method further comprises:
determining said quality of service requirement in accordance with said service plan profile.

59. The computer-readable medium according to claim 56, wherein the method further comprises:
switching packets associated with said voice call between said first interface and said second interface.

60. The computer-readable medium according to claim 59, wherein the method further comprises:
converting said voice call into said packets having an intermediate switching media type.

61. The computer-readable medium according to claim 60, wherein said intermediate switching media type is ATM cells.

62. The computer-readable medium according to claim 59, wherein the method further comprises:
associating said voice call with a quality of service requirement, said switching packets associated with said voice call being adapted to switch said packets at a rate corresponding to said quality of service requirement.

63. The computer-readable medium according to claim 62, wherein the method further comprises:
determining said quality of service requirement in accordance with said service plan profile.

* * * * *